United States Patent
Wang et al.

[11] Patent Number: 5,866,873
[45] Date of Patent: Feb. 2, 1999

[54] WELDING POWER CONTROL APPARATUS FOR CONSUMABLE-ELECTRODE TYPE PULSE ARC WELDING, AND A METHOD THEREFOR

[75] Inventors: Jing Bo Wang, Toyonaka; Tetsu Innami, Osaka; Hideki Ihara, Takarazuka, all of Japan

[73] Assignee: Matsushita Electric Industrial Co., Ltd., Osaka-fu, Japan

[21] Appl. No.: 790,895

[22] Filed: Jan. 29, 1997

[30] Foreign Application Priority Data

Jan. 31, 1996 [JP] Japan ........................................ 8-38843

[51] Int. Cl.$^6$ ............................................ B23K 9/09
[52] U.S. Cl. ........................... 219/130.51; 219/137 PS
[58] Field of Search ......................... 219/130.51, 137 PS

[56] References Cited

U.S. PATENT DOCUMENTS 3,781,511 12/1973 Rygiol .
5,525,778 6/1996 Matsui et al. ...................... 219/130.51

FOREIGN PATENT DOCUMENTS 0478796 8/1992 European Pat. Off. .
0715921 12/1996 European Pat. Off. .
2-31630 4/1985 Japan .
2242547 2/1991 United Kingdom .

OTHER PUBLICATIONS

A Japanese Language Abstract of JP 2–31630.

*Primary Examiner*—Clifford C. Shaw
*Attorney, Agent, or Firm*—Greenblum & Bernstein, P.L.C.

[57] ABSTRACT

A welding power control apparatus that removes the effects of shorting and noise to accurately detect droplet separation, thereby reducing spatter during droplet separation and when shorting occurs, and stabilizing welding results is achieved. Welding conditions such as welding voltage, welding current, shorting, and droplet separation are detected. Based on thus detected welding conditions, a pulse wave configuration unit generates a steady-state pulse wave and a compensation pulse wave. The steady-state pulse wave is defined by a pulse height for a pulse period and a base height lower than the first pulse height for a base period. The compensation pulse wave defined by a compensation pulse height lower than the pulse height for a compensation period followed by the pulse wave based on said detected welding conditions.

45 Claims, 20 Drawing Sheets

WELDING POWER CONTROL APPARATUS FOR CONSUMABLE-ELECTRODE TYPE PULSE ARC WELDING, AND A METHOD THEREFOR

BACKGROUND OF THE INVENTION

1. Field of the invention

The present invention relates to a welding power control device and a method for a consumable-electrode type pulse arc welding used for welding with an automatically supplied consumable electrode using a shield gas of which the major component is carbon dioxide, and relates specifically to such method and apparatus whereby the spatter that occurs during welding is greatly reduced to stabilize welding results and to obtain a good welded surface.

2. Description of the prior art

Heretofore, for the consumable electrode-type pulsed arc welding method, a shield gas of an inert gas was employed, e.g., having argon gas as its main component. In this method, a peak current larger than a value of the critical current (above which spray transfer is possible) and a base current lower than the critical current (for maintaining an arc) are alternately supplied at a frequency corresponding to a consumable electrode (hereinafter, referred to as "wire") feeding speed. Thereby, spray transfer can be performed with a lower average current than the DC welding method, and the droplet transfer is performed during the period of base current such that a least arc force acts on the droplet. Consequently, spatter is significantly reduced.

However, the above-mentioned pulsed arc welding method is restricted in the choice of shielding gas composition, because the spatter reducing effect becomes weaker when the content ratio of carbon dioxide in a shielding gas exceeds 30%. Therefore, a large amount of argon gas is consumed. Accordingly, the cost of the shielding gas has been a main cause of the high running cost of the pulsed arc welding method.

While consumable electrode-type pulse arc welding methods and corresponding apparatuses (hereinafter referred to as "consumable electrode-welder) are essential processing tools for modern manufacturing industries, consumable-electrode welders that produce less spatter and provide stable operation are in demand.

Conventional consumable electrode-type pulsed arc welding apparatuses (welders) that use a shield gas of which the major component is carbon dioxide are typically controlled by a welding power (output) control method such as that described in Japanese Laid-Open (Examined) Patent Publication No. H2-31630. Specifically, in this document, an arc is generated by supplying the peak current and the base current alternately, letting a droplet detach by a pinch force at the initial stage of the peak current duration, and subsequently forming molten metal by melting the tip part of the wire (electrode). The formed molten metal then; detaches during the next peak current duration.

However, in the power control scheme in this consumable electrode-type pulsed arc welder, there is a danger of detached droplets becoming spatter, because the droplet detached during the peak current duration is subject to a strong arc force from to the peak current.

SUMMARY OF THE INVENTION

The object of the present invention is therefore to provide a welding power control apparatus for controlling a welding power of a consumable-electrode type pulse arc welding that uses a shield gas of which carbon dioxide is the major component.

In order to achieve the aforementioned objective, a welding power control apparatus according to the present invention comprises a welding condition detection means for detecting welding conditions; and a pulse wave generation means for generating a first pulse wave defined by a first pulse height for a first predetermined period, a base height lower than said first pulse height for a second predetermined period, and a second pulse wave defined by a second pulse height lower than said first pulse height for a third predetermined period followed by said first pulse wave based on said detected welding conditions.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
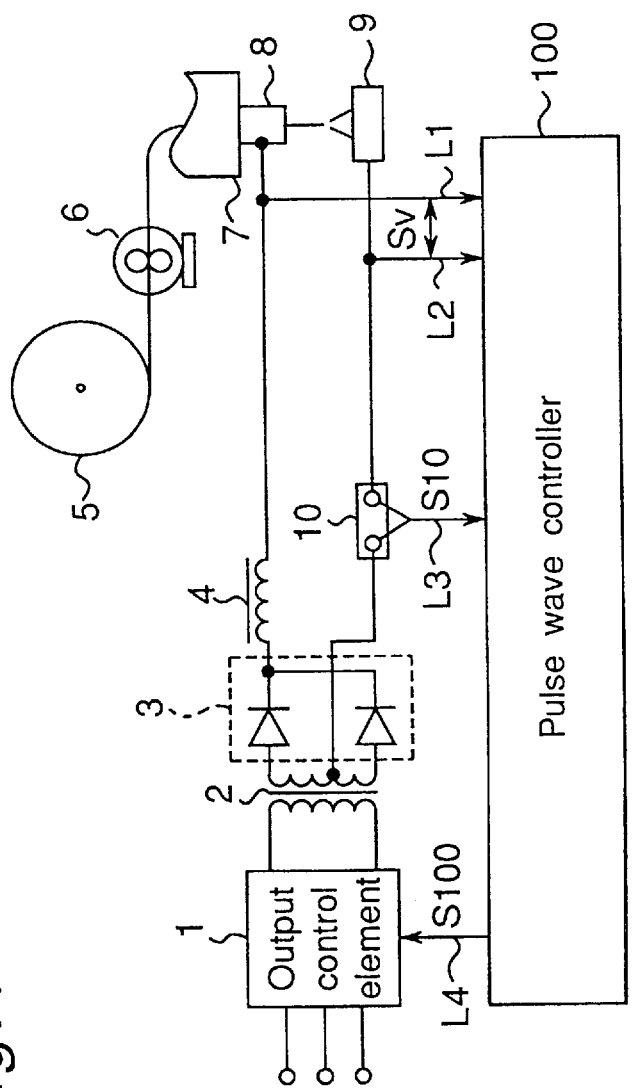
FIG. 1 is a block diagram showing a welding power controller according to the present invention, incorporated in a consumable electrode-type pulsed arc welding apparatus.

Referring to FIG. 1, a consumable electrode-type pulsed arc welding apparatus (hereinafter, referred to as "a welder"

for the sake of brevity) incorporating a welding power control device according to the present invention is shown. The welder includes an output control element 1, a voltage-reducing transformer 2, a rectifier 3, a reactor 4, a wire feed motor 6, a welding torch 7, a static electrode 8; a shunt 10; and a welding power control device 100 (a pulse wave configuration unit).

The output control element 1 is connected to an external power supply (not shown) for receiving three-phase AC power having a high voltage and low frequency, and producing a single phase AC power having a voltage lower and a frequency higher than those of the thee-phase AC power. Furthermore, the output control element 1 is connected to the welding power controller 100 and receives an output control signal S100 therefrom, to configuring the voltage pattern of the single-phase AC power, and the output control element 1 outputs thus configured electric power therefrom.

The voltage-reducing transformer 2 is connected to the output control element 1, and receives the single-phase AC power therefrom. The voltage-reducing transformer 2 then reduces the voltage of the received high voltage power to a voltage level suitable for welding, and produces single-phase low voltage AC welding power.

The rectifier 3 is connected to the voltage-reducing transfer 2 and receives the single-phase low voltage AC power therefrom which is rectified to produce DC welding power. The rectifier is usually constructed from (but not limited to) diodes.

The reactor 4 is connected to an output port of the rectifier 3, and receives DC welding power therefrom, regulating the voltage thereof. The reactor 4 is further connected to the static electrode 8 for supplying the regulated DC welding power thereto.

The consumable electrode (wire) 5 is fed by the wire feed motor 6 through the welding torch 7 toward the weld on the material 9 from the static electrode 8. Thus, DC welding power is also supplied to the wire (consumable electrode) 5 by the static electrode 8.

The shunt 10 is connected between the material 9 and an output side of the transformer 2 for detecting a current of the welding power actually used for welding operation. A voltage acting on the shunt 10 is indicative of the actual welding condition, and is extracted as a welding current signal S10 through a line L3. Lines L1 and L2 are connected to the static electrode 8 and the material 9 for detecting a welding voltage Sv acting therebetween.

The welding power controller 100 is connected to lines L1 and L2 for detecting the welding voltage Sv. The welding power controller 100 is further connected to the line L3 and receives the welding current signal S1 indicative of the welding current. Based on this electrical information, the welding power control device 100 determines the pattern of pulse waves suitable for the welding operation, and produces the output control signal S100. As apparent from the above, the welding power is controlled by the output control signal S100.

Figure 20:
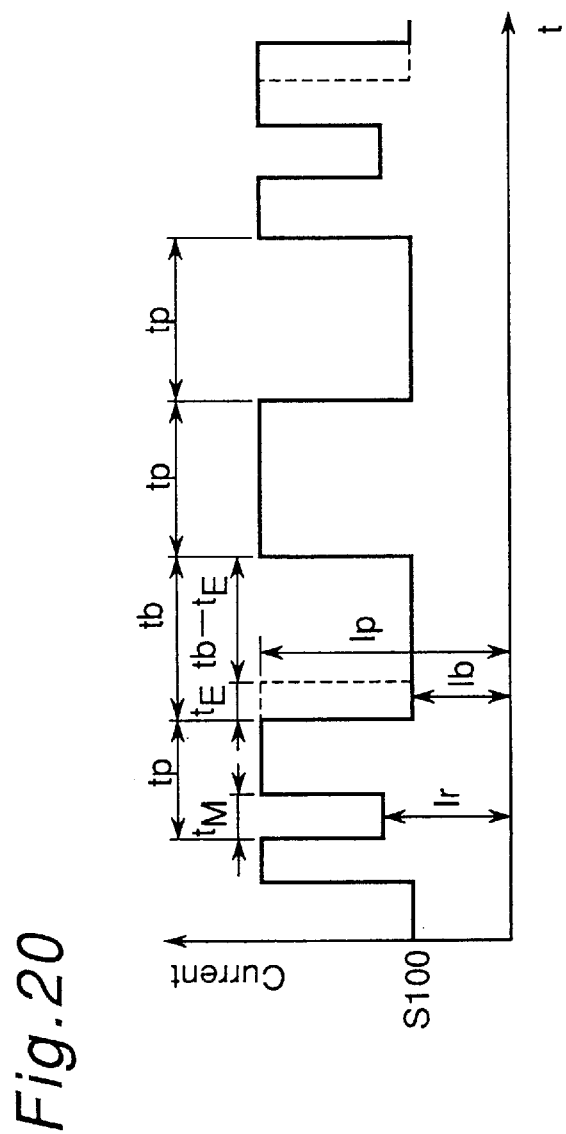
FIG. 20 is a graph showing the operation of the welding power controller of FIG. 1.

The operation of the welding power controller 100 is briefly described below with reference to a typical example of pulse output control signal S100, shown in FIG. 20. Specifically, the pulse wave controller 100 controls the output control signal S100 so as to separate the material droplet by means of a pinch force at the start of the pulse period tp, then melts the tip of the wire 5 to form another droplet, and then shapes the droplet during the next base period tb.

When the droplet separates during pulse period tp with this welding power (output) control method, however, the strong arcing force produced from the pulse current may cause the separated droplet to disperse, resulting in spatter. This may be prevented by a system that detects the timing of droplet separation using the spikes that occur in the welding voltage waveform each time a droplet separates, when the current is controlled to a constant level during the pulse period tp. Welding power (output) is then reduced during the period from droplet separation detection to complete transfer of the droplet (material) to the molten pool.

When welding power output is controlled to lower the welding voltage after droplet separation is detected, however, welding power drops at each droplet separation. This makes it necessary to separately provide some control for stabilizing welding power output, i.e., welding results. To achieve this, therefore, the welding power is compensated by detecting droplet separation and lengthening the pulse period tp, during which welding power is lowered for a particular extension period tE, as indicated by a dotted line in FIG. 20, to obtain output equivalent to that before welding output was lowered.

When the welding current is controlled to a constant level during the peak period, the self-adjusting operation of the arc is lost. By feeding back the welding voltage to stabilize welding, however, it is also possible to adjust (according to the feedback value) the extension period tE of the pulse period tp in which droplet separation was detected.

Furthermore, another system for improving welding stabilization may be provided. Specifically, this system detects droplet separation based on the welding voltage; controls the current to a constant level during the pulse period until droplet separation is detected; then drops the current level during period tr, i.e., the period from the droplet separation detection timing to at least the complete transfer of the droplet to the molten pool; and then controls the welding voltage to a constant level for the duration of the pulse period.

Details of the welding power control method, as well as the welding power control apparatus described above, is disclosed in U.S. patent application Ser. No. 08/566,546 by Tetsu INNAMI, Wang JING BO, and Hideki HARA filed Apr. 12, 1995, assigned to the same assignee as the present invention and application. The entire contents of this U.S. patent application Ser. No. 08/566,546 is expressly incorporated by reference.

As described above, this system makes it possible to change the pulse period according to the feedback welding voltage, and stabilize welding by applying constant voltage control for at least part of the pulse period. Because the pulse period tp in which droplet separation is detected is extended, however, the base period immediately following the lengthened pulse period is shortened as indicated by a dotted line in FIG. 20 if the pulse cycle is constant. This results in incomplete shaping of the droplet formed in the preceding pulse period during this shortened base period tb, thereby preventing droplet separation during the next pulse period, and causing the droplet to grow greatly.

Consumable electrode-type pulse arc welding, using a shield gas of which the major component is carbon dioxide, also normally occurs during the material transfer state. Shorting may therefore occur depending upon the welding conditions. During the period starting from the time when shorting accompanying droplet transfer is released to the time when arcing begins, a droplet that is large enough to separate must be formed in the next pulse period.

It is therefore necessary to distinguish and appropriately handle shorting accompanied by droplet transfer from shorting not accompanied by droplet transfer. The welding power control apparatuses and their methods according to the present invention can satisfy such needs, and greatly reduce the spatter that occurs during welding to stabilize welding results. The constructions and operations of such welding power control apparatuses are described in detail below.

First embodiment

Figure 2:
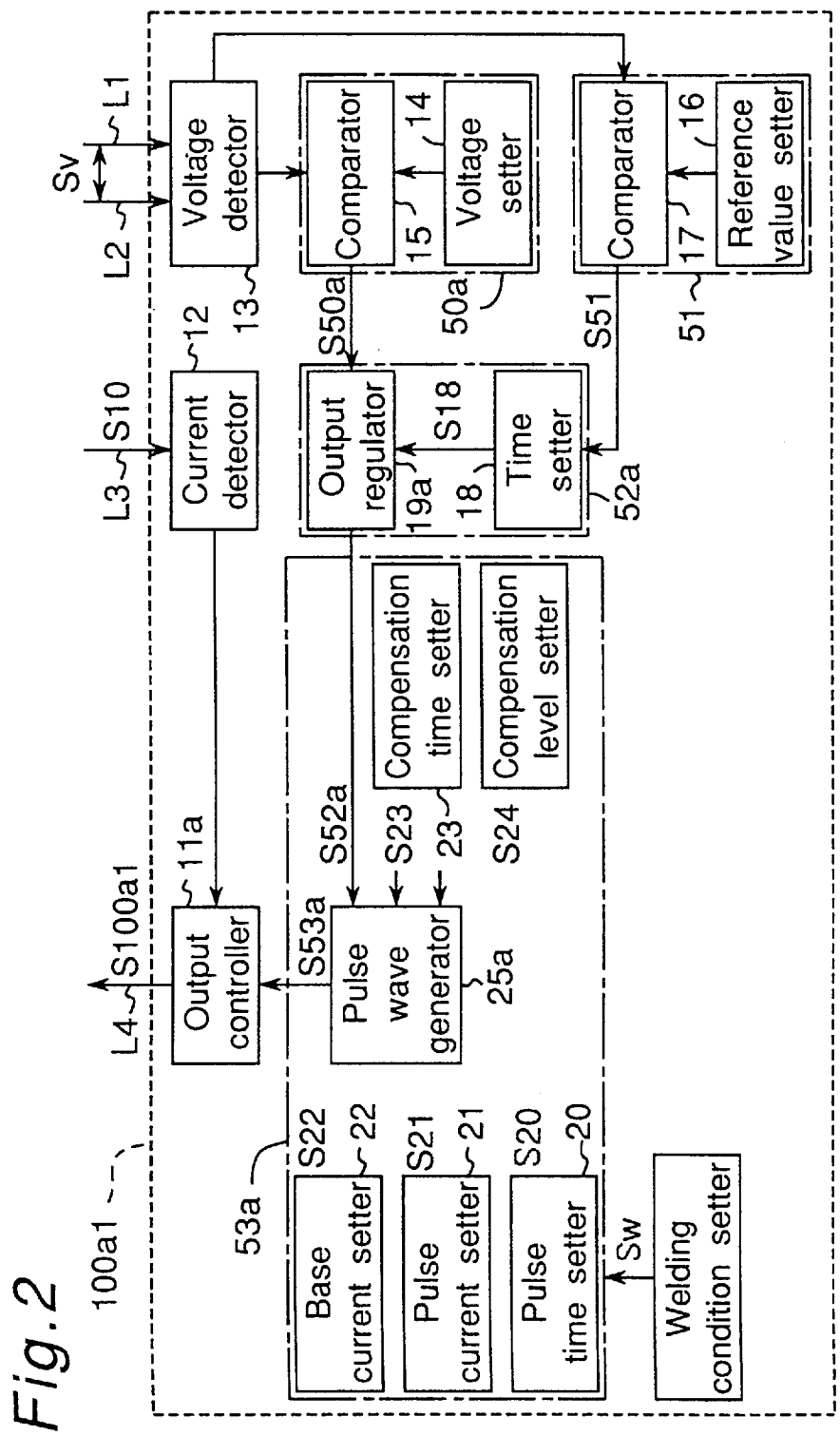
FIG. 2 is a block diagram showing a welding power controller according to a first embodiment of the present invention.

Referring to FIG. 2, details of the welding power controller (pulse wave controller) according to a first embodiment of the present invention is shown. The pulse wave controller 100a1 of this example includes a welding voltage detector 13 connected to the lines L1 and L2 for detecting the welding voltage Sv between the electrode 8 (5) and the material 9, to produce a welding voltage signal indicative of detected welding voltage Sv.

A droplet separation detector 50a is connected to the welding voltage detector 13 and receives the welding voltage signal therefrom to detect the droplet separation, and further produces a droplet separation detection signal S50a. Specifically, the droplet separation detector 50a includes a voltage setter 14 and a first comparator 15. The voltage setter 14 produces a first reference signal in correspondence with a first reference voltage that is properly set in consideration of changes of the welding voltage Sv during welding operation. The first comparator 15 is connected to the voltage detector 13 and the voltage setter 14 and receives the welding voltage signal and the first reference voltage signal therefrom, respectively, for comparison. The first comparator 15 produces a signal when the detected welding voltage exceeds the first reference voltage, and outputs the signal as the droplet separation detection signal S50a therefrom. Thus, the droplet separation from the wire is detected.

A shorting detector 51 is connected to the voltage detector 13 and receives the welding voltage signal therefrom to detect shorting, and further produces a shorting detection signal S51. Specifically, the shorting detector 51 includes a second reference value setter 16 and a second comparator 17. The reference value setter 16 produce a second reference signal corresponding to a second reference voltage designated by a reference value that is (properly) set in consideration of changes the welding voltage Sv during welding operation. The second comparator 17 is connected to the voltage detector 13 and the reference value setter 16 and receives the welding voltage signal and the second reference signal therefrom, respectively, for comparison. The second comparator 17 produces a signal when the detected welding voltage is below the second reference voltage, and outputs the signal as the shorting detection signal S51. Thus, shorting between the wire 5 and the material 9 is detected.

An output compensator 52a is connected to the droplet separation detector 50a and the shorting detector 51 and receives the droplet separation detection signal S50a and the shorting detection signal S51 therefrom, respectively. Based on these two signals S50a and S51, the output compensator 52a produces an output compensation signal S52a for the welding power (mainly current). Specifically, the output compensator 52a includes a time setter 18 and an output regulator 19a. The time setter 18 is connected to the shorting detector 51 for setting a specific time according to the short detection signal S51 output from the shorting detector 51 (17), and produces a time signal S18.

The output regulator 19a is connected to the droplet separation detector 50a (15) and the time setter 18 and receives the detection signal S50a and the time signal S18 therefrom, respectively. The output regulator 19a directly outputs (throughputs) the droplet separation detection signal S50a as the compensation signal S52a when shorting is not detected. However, when shorting is detected, the output regulator 19a cancels outputting the droplet separation detection signal S52a therefrom for the time indicated by the time signal S18 from the time shorting ends. Thus, outputting of the compensation signal S52a is controlled based on the droplet separation and the shorting of the wire 5 and the material 9.

A current detector 12 is connected to the line L3 and receives the welding current signal S10 therefrom to detect the welding current used for welding operation. The current detector 12 further produces a current signal indicative of thus detected welding current.

A welding condition setter 60 is provided for setting various information essentially influencing the spatter occurrence, such as feeding speed of the consumable electrode (wire) 5 and pulsating patterns to produce a welding condition signal Sw. The welding condition setter 60 preferably includes a keyboard by which the user can input the welding conditions, and a CPU for converting thus inputted welding conditions into parameters and forms suitable for operation. The welding condition setter 60 can be any storage device such as ROM having the parameters predetermined and stored in advance, and can be connected to the wire feed motor 6 for detecting the wire feeding speed.

A pulse wave generation unit 53a is connected to the output compensator 52a and the welding condition setter 60 and receives the signal S52a and welding condition signal Sw therefrom, respectively. Based on these two signals S52a and Sw, the pulse wave configuration unit 53a generates a welding pulse wave signal S53a. Specifically, the pulse wave configuration unit 53a includes a pulse time setter 20, a pulse current setter 21, a base current setter 22, a compensation time setter 23, a compensation level setter 24, and a pulse wave generator 25a. Each of these setters 20, 21, 22, 23, and 24 sets a specific parameter respectively in response to the welding condition signal Sw, and further produces a signal indicative of the specific parameter, as follows.

The pulse time setter 20 sets the duration of the pulse period tp (FIG. 20) and the base period tb (FIG. 20) of the welding current waveform. Then, the pulse time setter 20 produces a pulse period signal S20.

The pulse current setter 21 sets the pulse current Ip during the pulse period tp of the welding current. Then, the pulse current setter 21 produces a pulse current signal S21.

The base current setter 22 sets the base current Ib in the base period tb of the welding current. Then, the base current setter 22 produces a base current signal S22.

The compensation time setter 23 sets the time correcting the pulse current to a compensation current level Ir that is lower than the pulse current Ip. Then, the compensation time setter 23 produces a compensation time signal S23.

The compensation level setter 24 sets the compensation current level Ir. Then, the compensation level setter 24 produces a compensation level signal S24.

The pulse wave generator 25a is connected to the setters 20, 21, 22, 23, and 24 and receives signals S20, S21, S22, S23, and S24 therefrom, respectively, and is further connected to the output compensator 52a for receiving the output compensation signal S52a therefrom, to generate a signal having a pulse wave that is configured in response to each of signals S20, S21, S22, S23, S24, and S52a. Specifically, a current waveform (hereafter "steady-state pulse wave") determined by the pulse time setter 20, pulse current setter 21, and base current setter 22 is periodically output, and this steady-state pulse wave is corrected based on the compensation time signal S23 and the compensation level signal S24 according to the signal S52a from the output compensator 19. This signal is output from the pulse wave configuration unit 53a as the welding pulse wave signal S53a. The generation of the welding pulse wave signal S53a will be specifically described later with reference to FIG. 3.

The output controller 11a is connected to the current detector 12 and the pulse wave configuration unit 53a and receives the current signal and the welding pulse wave signal S53a therefrom, respectively. Based on these two signals, the output controller 11a produces the output control signal S100a. Based on the current signal S10 that is a voltage signal changing according to the value of electric current used for welding operation, the current detector 12 detects the actual current value of the welding power. Specifically, the output controller 11a compares the actual welding current value from the current detector and the welding pulse wave signal S53a from the pulse wave configuration unit 53a. Then the output controller 11a of the pulse wave controller 100 produces an output control signal S100 having a pulse wave suitably configured so that the output control element 1 can produce welding power correctly compensated in accordance with the actual welding condition, or welding current. Although the welding power control is described with respect to the welding current in this specification, it is needless to say that the welding power control according to the present invention can be performed according to the welding voltage.

Figure 3:
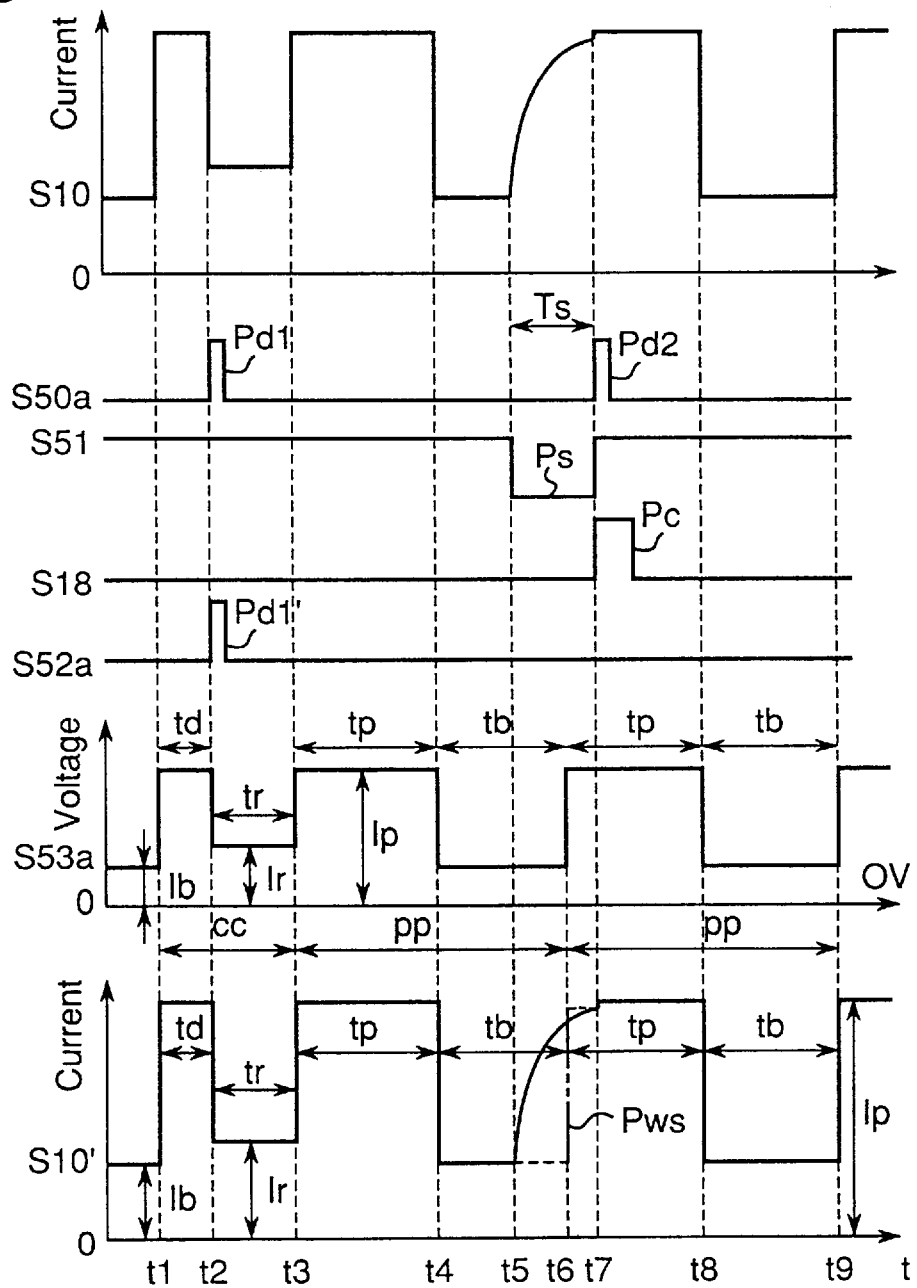
FIG. 3 is a graph showing various signals observed in the welding power controller of FIG. 2.

With reference to FIG. 3, the pulse wave control operation of the invention thus comprised is described below. In FIG. 3, t1 indicates the time when one cycle CC of the welding power control starts; t2 indicates the time when the droplet separates from the wire 5; t3 indicates the time when the one cycle CC started at time t2 terminates and one pulse period tp starts; t4 indicates the one pulse period tp started at time t3 terminates and one base period tb starts; t5 indicates the time when the shorting occurs; t6 indicates the time when the one base period tb started at time t4 terminates; t7 indicates the time when the shorting occurring at time t5 is discovered and the beginning of next one pulse period tp; t8 indicates the time when the one pulse period tb terminates and the next one base period tb starts; and t8 indicates the time when the base period tb terminates. It should be noted that a pair of one pulse period tp and one base period tb makes one pulse period PP.

Until the output compensation signal S52a from the output compensator 52a is input during welding, i.e., until droplet separation is detected at time t2, the pulse wave generator 25a outputs the welding pulse wave signal S53a to the output controller 11 where pulse wave signal S53a is the steady-state pulse wave determined by the pulse period tp and base period tb set by the pulse time setter 20, the pulse current Ip set by the pulse current setter 21, and the base current Ib set by the base current setter 22.

The output controller 11 thus controls the output control element 1 to shape the welding current pulse wave to the waveform specified by the pulse wave configuration unit 53a (pulse wave generator 25a). The wire tip is heated and melted as this steady-state pulse wave is repeatedly applied from time t1 to t3, resulting eventually in droplet separation at time t2. At this time t2, the comparator 15 compares the detected welding voltage Sv input from the welding voltage detector 13 with the reference voltage signal from the voltage setter 14, and when the detected voltage Sv exceeds the reference voltage outputs the droplet separation detection signal S50a having a peak pulse Pd1 to the output compensator 52a (19a).

The operation of the output compensator 52a (19) is thus described next below. Pulse arc welding, using a shield gas of which carbon dioxide is the major component, normally occurs during the material (droplet) transfer stage, during which time shorting may occur depending upon the welding conditions. This may produce a sudden voltage rise when shorting changes to arcing.

As a result, when droplet separation is detected from the welding voltage Sv, a voltage rise component caused by shorting may be contained in the droplet separation detection signal of the comparator 15, which thus falsely detects droplet separation. This makes it necessary to cancel the droplet separation detection signal of the comparator 15 for a constant period after shorting stops. This constant cancellation period is set by the time setter 18, and is determined according to the response speed. The response speed is at least partially determined by the time constant of the power circuit containing the output control element 1. In general the constant cancellation period is approximately 1 ms.

When the shorting occurs at time t5 and terminates at time t7, the shorting detection signal S51 shows an under going pulse Ps. The output compensator 52a cancels the droplet separation detection signal S50a having a peak Pd2 starting at time t7, supplied to the output regulator 19a from the detector 50a (comparator 15), by a pulse existing longer than the peak P2 for the constant cancellation period set by the time setter 18 after the end of shorting. When shorting does not occur, the output compensator 50 directly outputs the droplet separation detection signal S50a as the output control signal S52a to the pulse wave generator 25a of the pulse wave configuration unit 53a without being truncated. Thus, the output compensation signal S52a only shows the peak Pd1 in FIG. 3.

When the output compensation signal S52a is not input from the output compensator 52a (19a), the pulse wave generator 25a repeatedly outputs the steady-state pulse wave signal S53a (as best shown from time t3 to t9). When the output compensation signal S52a is then input (time t2), the welding current S10' is dropped to a compensation current level Ir for the compensation period tr (from time t2 to t3), where the compensation current level Ir is the level set by the compensation level setter 24 lower than the peak current Ip, and the compensation period tr is set by the compensation time setter 23 as the time required for complete droplet transfer to the molten pool starting from the output compensation signal input time. After the compensation period tr has passed, the steady-state pulse wave starting at pulse period tp is output from the pulse wave generator 25 to the output controller 11. When the shorting does not occur, the welding current S10' shows the steady-state pulse wave as indicated by an imaginary line (from time t5 to t7).

This operation is executed every time droplet separation is detected. By dropping the welding current to the compensation current level Ir (at a lower level than the pulse current Ip) during the compensation period tr from droplet separation detection until the droplet is at least completely transferred to the molten pool, and then outputting the steady-state pulse wave that begins at pulse period tp from the point the compensation period tr has passed, false droplet separation detection caused by shorting can be avoided and droplet separation can be accurately detected. As a result, when droplet separation is detected, the separated droplet can be reliably transferred to the molten pool while arcing is weak, thereby reducing spatter, achieving a uniform droplet separation cycle, and thus improving welding stability.

It should be noted that while the steady-state pulse wave in the present embodiment is a constant-current control waveform determined by the pulse current Ip and base current Ib, the same effect can be obtained using a constant-voltage control waveform determined by the pulse voltage Vp.

Note, further, that the droplet separation detector 50, shorting detector 51, output compensator 52, and pulse wave generator 53 are also shown in FIG. 1.

Figure 4:
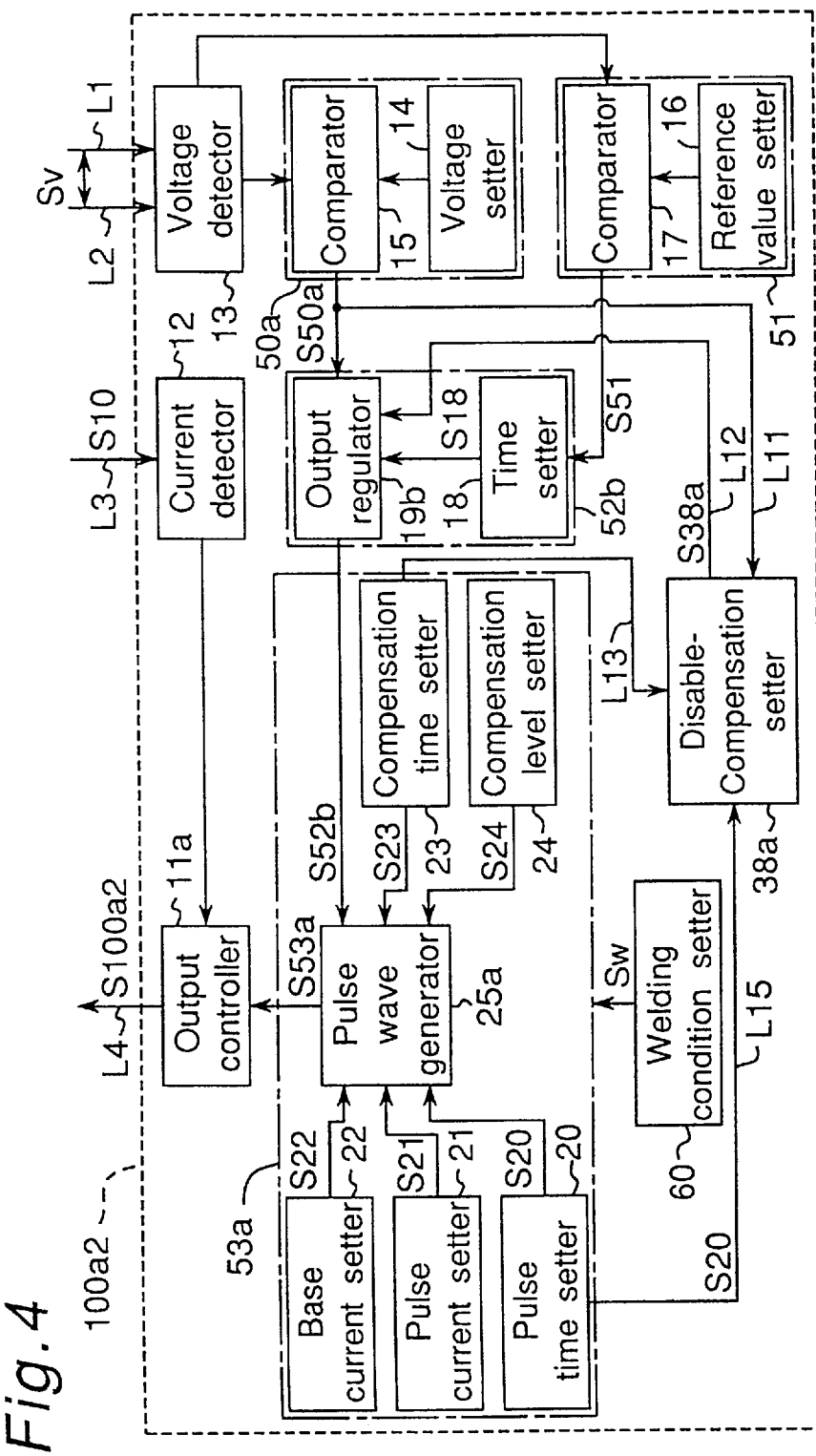
FIG. 4 is a block diagram showing an alternative to the welding power controller shown in FIG. 2.

Referring to FIG. 4, an alternative of the welding power controller 100a1 of FIG. 3 is shown. This welding power controller 100a2 has a construction very similar to that of the controller 100a1, but additionally includes a disable-compensation setter 38a. Further more the output compensator 52a is replaced by an alternative output compensator 52b, and the output regulator 19a is also replaced by an alternative output regulator 19b.

The disable-compensation setter 38a is connected to the compensation time setter 23 by a line L13 and to the pulse time setter 20 by a line L15 of the pulse wave configuration unit 53a and receives the compensation time signal S23 and the pulse time signal S20 therefrom, respectively. The disable-compensation setter 38a is further connected to the comparator 15 of the droplet separation detector 50a by a line L11 and receives the droplet separation detection signal S50a therefrom. Based on these signals S20, S23, and S50a, the disable-compensation setter 38a produces a disable-compensation signal S38a.

The output regulator 19b is connected to the disable-compensation setter 38a by a line L13 and receives the disable-compensation signal S38a therefrom. Based on this signal S38a in addition to the two signals S50a and S18, the output regulator 19a produces an output compensation signal S52a.

This disable-compensation setter 38a outputs the disable-compensation signal S38a to the output compensator 52b (19b) during the pulse period tp of the steady-state pulse wave following the compensation period tr for droplet separation. This disable-compensation signal S38a causes the output compensator 52b (19b) to ignore (cancel) the droplet separation detection signal S50a input from the droplet separation detector 50a (15) even during the period in which the disable-compensation signal S38a is input together with the constant period set by the time setter 18. At all other times the output compensator 52b (19b) outputs the droplet separation detection signal S50a as the output compensation signal S52b to the pulse wave generator 25a of the pulse wave configuration unit 53a.

The new pulse period tp output immediately after droplet separation is detected and the output pulse current is lowered to the compensation current level Ir for the compensation period tr is the period in which a droplet is again formed on the wire end during welding. However, the arc length in this period is still long, and the welding power is therefore subject to the effects of external noise, and droplet separation may be easily falsely detected. To prevent this, the output compensator 52b (19b) is prohibited from outputting the droplet separation detection signal S50a as the output compensation signal S52b immediately after droplet separation is detected during the period in which a droplet is again formed on the wire end, even if droplet separation is detected by the droplet separation detector 50a (15). This disable-compensation period may be set to the pulse period tp set by the pulse time setter 20 of the pulse wave configuration unit 53a, for example.

This alternative welding power controller 100a2 operates as follows.

If neither of the output compensation signal S52b from the output compensator 52b (19b) is input to the pulse wave generator 25a output compensator 52b nor the shorting detection signal S51 from the shorting detector 51 (17) is input to the output compensator 52b (18) during welding, the pulse wave generator 25a outputs the steady-state pulse wave to the output controller 11.

When the output compensation signal S52b from the output compensator 52b (19b) is then supplied to the pulse wave generator 25a, the pulse wave generator 25a outputs a low level compensation current level Ir for the compensation period tr set by the compensation time setter 23, starting from the input time of the output compensation signal S52b from the output compensator 52b (19b), as in the first embodiment above. When the compensation period tr has passed, the steady-state pulse wave starting at pulse period tp is then output to the output controller 11a.

During the pulse period following immediately after completion of the compensation period tr, the output compensator 52b (19b) ignores the droplet separation detection signal S50a from the droplet separation detector 50a (15), as instructed by the disable-compensation setter 38a, and outputs nothing as the output compensation signal S52b to the pulse wave generator 25a, i.e., does not output to the pulse wave generator 25a.

When the shorting detection signal S51 is input from the shorting detector 51 (17), the steady-state pulse wave output is interrupted for the shorting period to effectively cancel the effects of shorting, and the steady-state pulse wave starting from the pulse period tp is output from the time shorting changes to arcing. As a result, droplet formation after shorting is promoted, a uniform droplet separation cycle is achieved, and welding stability is improved.

Figure 5:
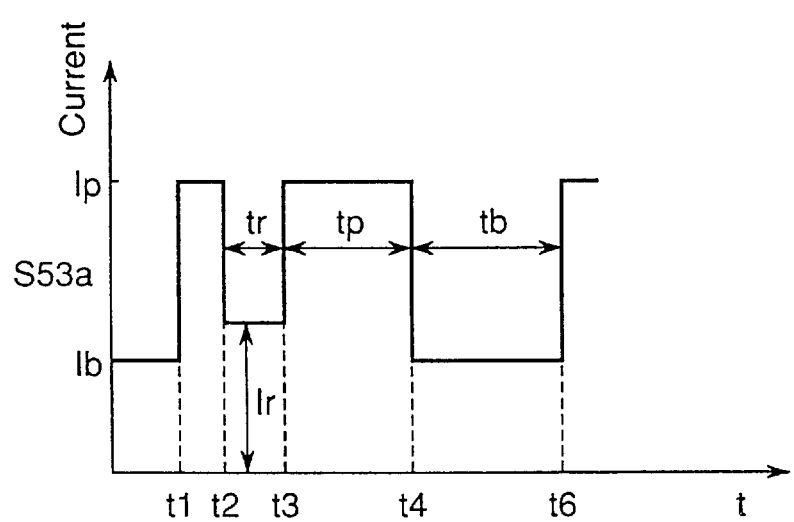
FIG. 5 is a graph showing a wave form of pulse wave signal generated by the welding power controller of FIG. 4.

Referring to FIG. 5, a waveform of the welding pulse wave signal S53a when shorting is detected is shown. As a result, this alternative of first embodiment achieves at least the same effects as those of the first embodiment by repeating the operation described above during welding. In addition, however, false detection of droplet separation due to noise during droplet formation immediately after droplet separation can be prevented.

It should be noted that while the steady-state pulse wave in the present embodiment is a constant-current control waveform determined by the pulse current Ip and base current Ib, the same effect can be obtained using a constant-voltage control waveform determined by the pulse voltage Vp.

Second embodiment

Figure 6:
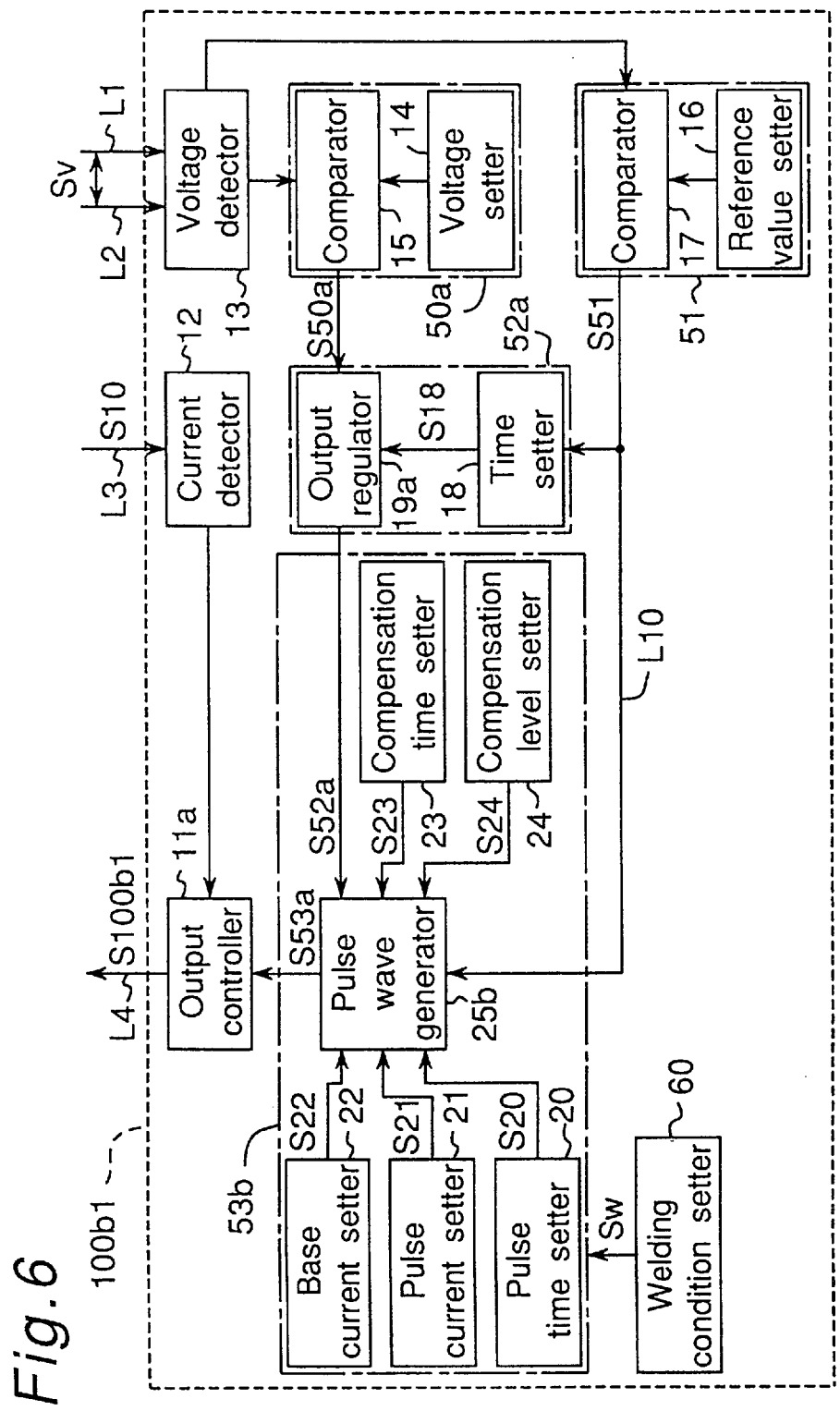
FIG. 6 is a block diagram showing a welding power controller according to a second embodiment of the present invention.

Referring to FIG. 6, a welding power controller according to a second embodiment of the present invention is shown. This welding power controller 100a1 has a construction very similar to that of the controller 100a1 according to the first embodiment shown in FIG. 2. The welding power controller 100b1 differs from the welding power controller 100a1 in that the pulse configuration unit 53a in FIG. 2 is replaced by an alternative pulse configuration unit 53b, and the pulse wave generator 25a is also replaced by an alternative pulse wave generator 25b.

The pulse wave generator 25b controls the output waveform S53b using the output compensation S52a and the short detection signal S51. When droplet separation is detected, the same operation executed in the first embodiment is executed, thereby reducing spatter, and assuring formation of a droplet sufficient to assure separation at the next pulse period when shorting has occurred by outputting a steady-state pulse wave from the time shorting starts.

Figure 7:
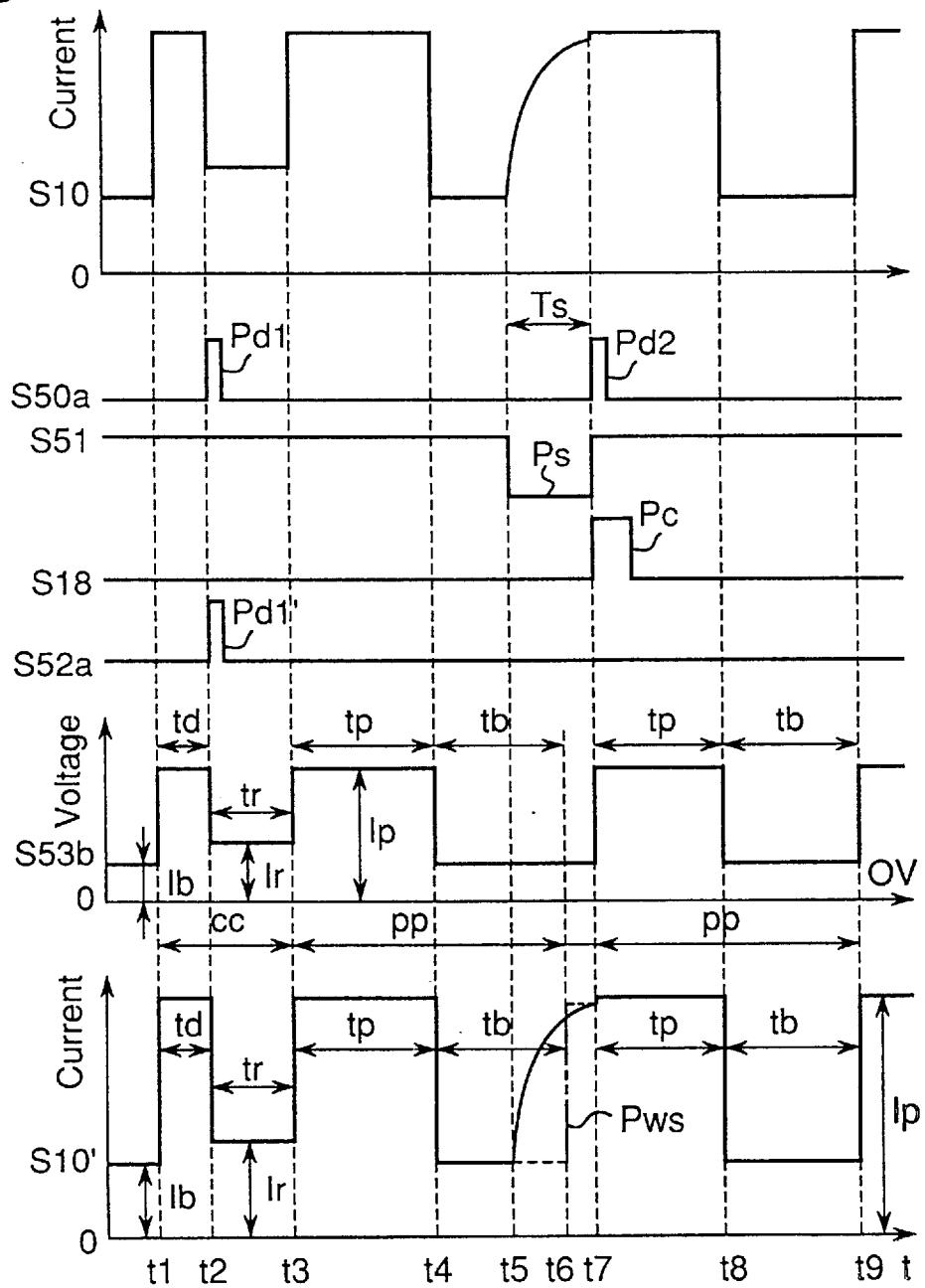
FIG. 7 is a graph showing various signals observed in the welding power controller of FIG. 6.

With reference to FIG. 7, the pulse wave control operation according to this embodiment is described below. In FIG. 7, times t1 to t9 are substantially the same as those in FIG. 3.

If neither the output compensation signal S52a nor the short detection signal S51 is input to the pulse wave generator 25b during welding (t1 to t2), the pulse wave generator 25b is controlled to output the steady-state pulse wave S53a to the output controller 11a as in the first embodiment above.

When the output compensation signal S52a is supplied to the pulse wave generator 25b at time t2, the pulse wave generator 25b outputs a low level compensation current level Ir for the compensation period tr (from time t2 to t3) set by the compensation time setter 23, starting from the input time t2 of the output compensation signal S52a (Pd1') from the output compensator 52a (19a), again as in the first embodiment above. When the compensation period tr has passed at time t3, the steady-state pulse wave starting at pulse period tp is then output to the output controller 11a (from time t3 to t4).

In the case that the short detection signal S51 is supplied to the pulse wave generator 25b at t5 during the base period tb (from time t4 and t6), the steady-state pulse wave starting at pulse period tp will be output to the output controller 11a at time t7, when it is determined that shorting has changed to arcing. Resultantly, the base period from time t4 to t6 is extended to the time t7.

This operation is executed each time the output compensation signal S52a or short detection signal S51 is input during welding. When droplet separation is detected, the welding current is dropped to a compensation current level Ir lower than the peak pulse current Ip for the period (from time t6 to t7) until the droplet is completely transferred to the molten pool, as in the first embodiment above, and the steady-state pulse wave S53a starting from the peak pulse period tp is then output. As a result, the separated droplet can be reliably transferred to the molten pool while arcing is weak when droplet separation is detected, thereby reducing spatter.

When shorting is detected (at time t5), however, steady-state pulse wave output (S53a) is interrupted for the shorting period (from time t6 to t7) to effectively cancel the effects of shorting, and the steady-state pulse wave starting from the peak pulse period tp is output from the time (t7) shorting changes to arcing. As a result, droplet formation after shorting is promoted, a uniform droplet separation cycle is achieved, and welding stability is improved.

It should be noted that while the steady-state pulse wave in the this embodiment is a constant-current control waveform determined by the pulse current Ip and base current Ib, the same effect can be obtained using a constant-voltage control waveform determined by the pulse voltage Vp.

Figure 8:
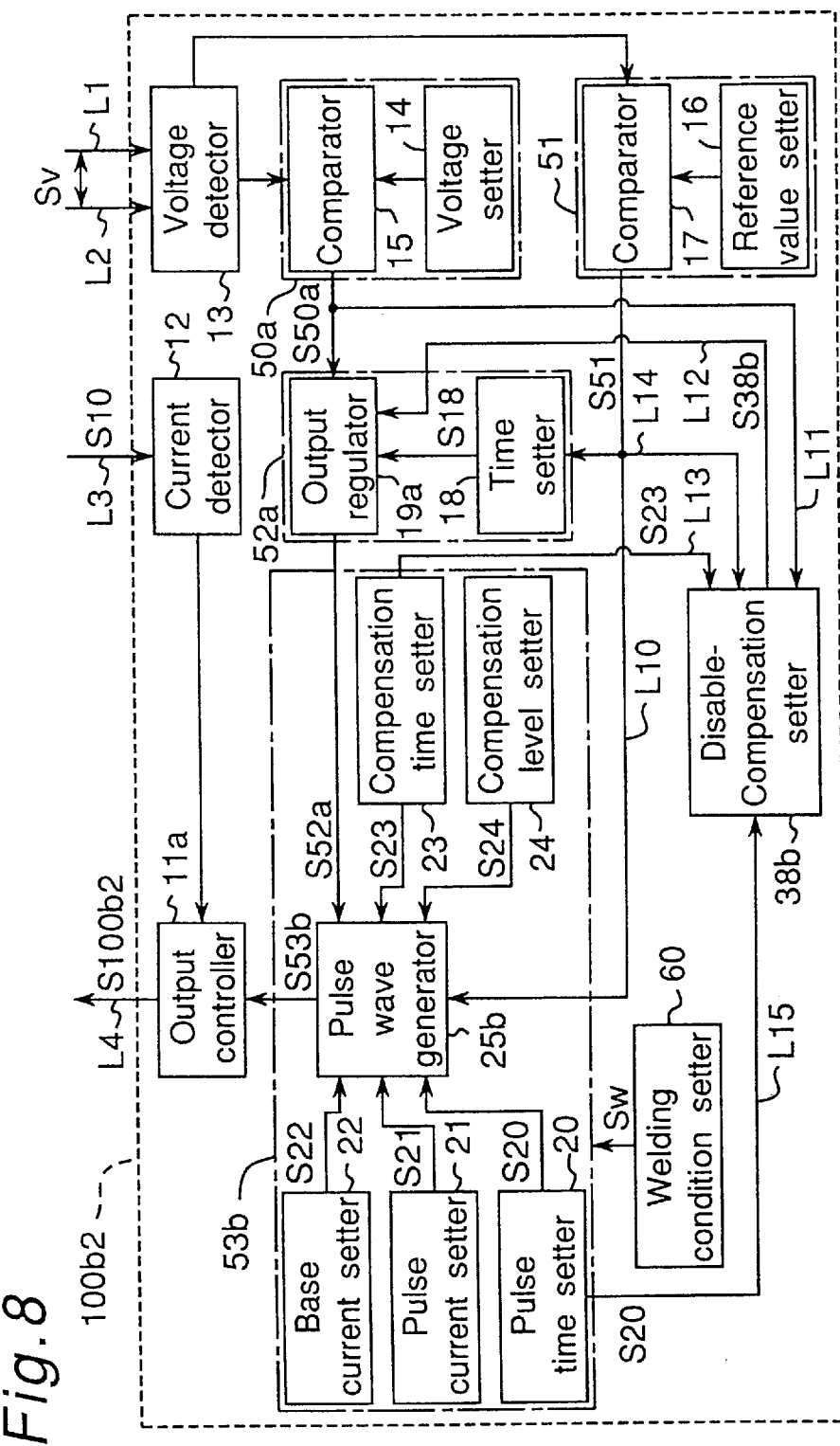
FIG. 8 is a block diagram showing a first alternative to the welding power controller of FIG. 6.

Referring to FIG. 8, a first alternative of the welding power controller 100b1 of FIG. 6 is shown. This welding power controller 100b2 has a construction very similar to that of the controller 100b1, but additionally includes a disable-compensation setter 38b similar to the disable-compensation setter 38a shown in FIG. 4. The disable-compensation setter 38b is connected to the droplet separation detector 50a by a line L11 and receives the droplet separation detection signal S50a therefrom, to the shorting detector 51 for receiving the shorting detection signal S51 therefrom, to the compensation setter S23 of the pulse wave configuration unit 53b by a line L13 and receives the compensation time signal S23 therefrom, and to the pulse time setter 20 of the pulse wave configuration unit 53b by a line L15 for receiving the pulse time signal S20 therefrom.

Based on these signals S50a, S51, S23, and S20, the disable compensation setter 38b produces a disable-compensation signal S38b. The disable-compensation setter 38b is further connected to the output regulator 19a of the output compensator 52a by a line L12 for supplying the disable-compensation signal S38b thereto.

The welding power controller 100b1 thus comprised operates as follows. Both the droplet separation detection signal S50a and the short detection signal S51 are input to the disable-compensation setter 38b, which in this embodiment prohibits output compensation both immediately after the compensation period tr when droplet separation is detected, and immediately after shorting when shorting is detected.

Figure 10:
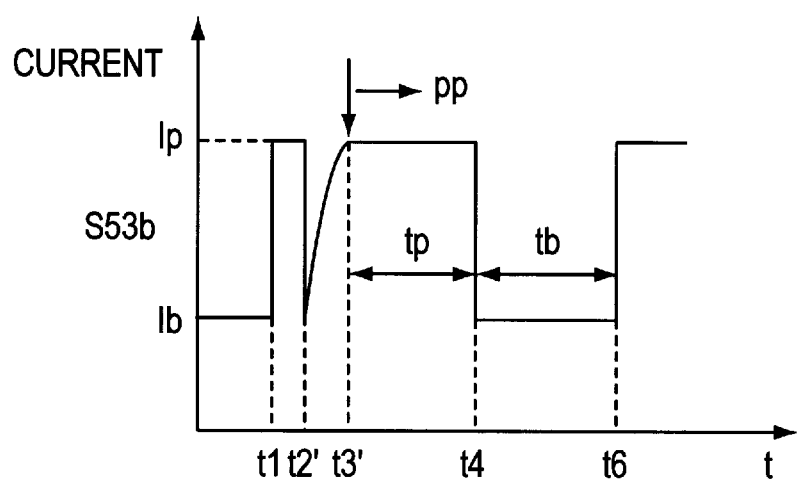
FIG. 10 is a graph showing a wave form of pulse wave signal generated by the welding power controller of FIG. 9.

The operation of this welding power controller 100b2 during compensation is identical to that of the controller 100a2 (FIG. 4) and the operation during shorting is identical to that of the welding power controller 100b3 shown in FIG. 3 according to a third embodiment, which will be described in detail with reference to FIG. 10.

Figure 9:
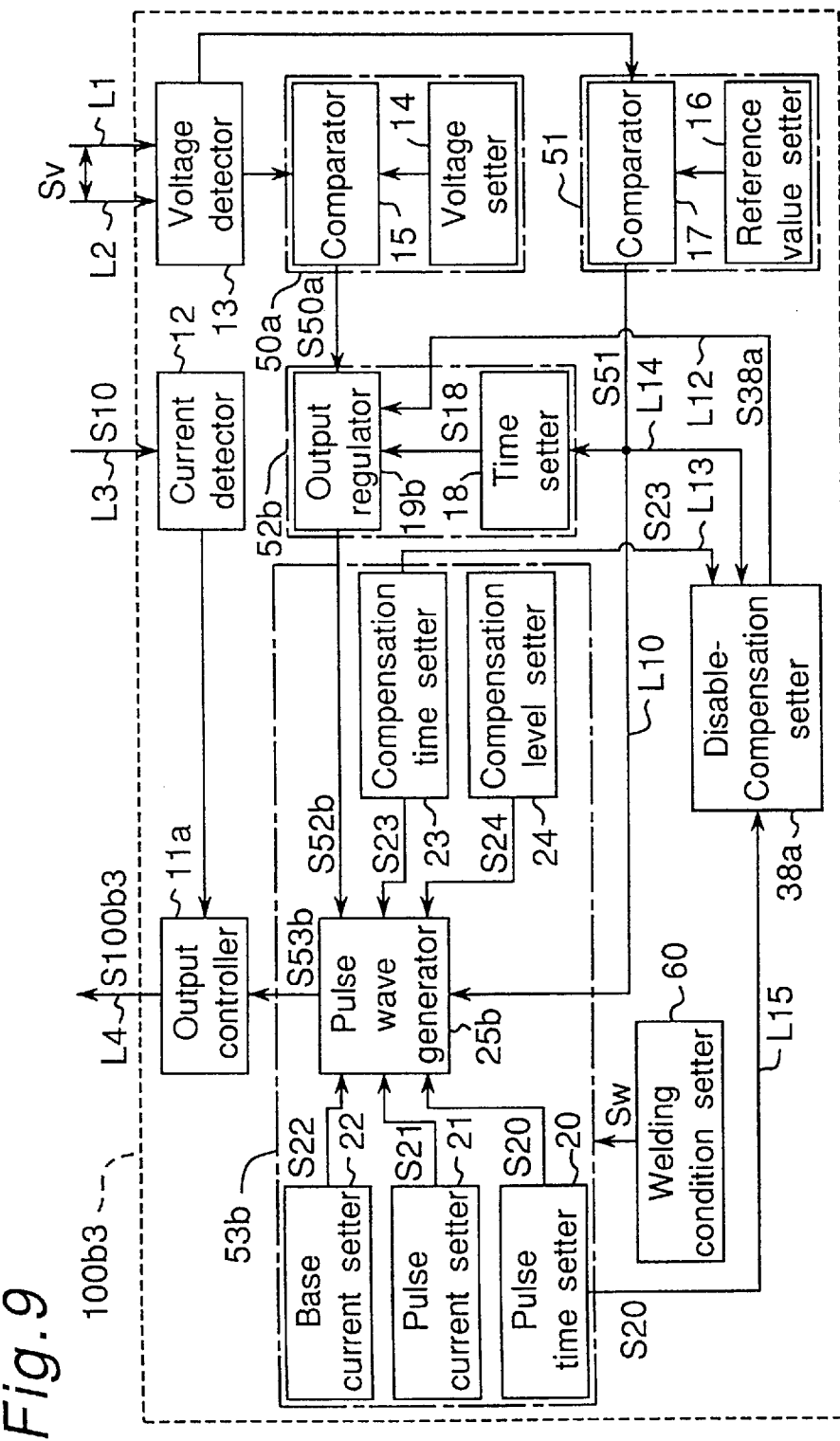
FIG. 9 is a block diagram showing a second alternative to the welding power controller of FIG. 6.

As a result, according to this alternative embodiment, the same effects as those of the welding power controller 100a2 (FIG. 4) and the welding power controller 100b3 (FIG. 9).

It should be noted that while the steady-state pulse wave in this embodiment is a constant-current control waveform determined by the pulse current Ip and base current Ib, the same effect can be obtained using a constant-voltage control waveform determined by the pulse voltage Vp. Note, further, that the means of the present embodiment can be combined with various other means of the preceding other embodiments.

Referring to FIG. 9, a second alternative of the welding power controller 100b1 of FIG. 6 is shown. This welding power controller 100b3 has a construction very similar to that of the controller 100b2 shown in FIG. 8, but the output compensator 52a shown in FIG. 8 is replaced by an alternative output compensator 52b, and the output regulator 19a is also replaced by an alternative output regulator 19b. The disable compensation setter 38b is replaced by the disable compensation setter 38a used in the controller 100a2 of FIG. 4.

In this welding power controller 100b3, when the short detection signal S51 is input to the disable-compensation setter 38a, the disable-compensation setter 38a outputs the disable-compensation signal S38a to the output regulator 19a of the output compensator 52a during the pulse period tp of the steady-state pulse wave output immediately after it is determined that shorting changed to arcing. The output compensator 52a (19a) thus ignores the droplet separation detection signal S50a from the droplet separation detector 50a (15) for the period set by the time setter 18 and the period of the disable-compensation signal S38a. When the disable-compensation setter 38a does not output the disable-compensation signal S38a, the output compensator 52b (19b) outputs the droplet separation detection signal S50a as the output compensation signal S52b to the pulse wave generator 25b.

The new pulse period tp output immediately after droplet separation is detected and the output pulse current is lowered to the compensation current level Ir for the compensation period tr is the period in which a droplet is again formed on the wire end during welding. However, the arc length in this period is still long, and the welder output is therefore subject to the effects of external noise, and droplet separation may be easily falsely detected. To prevent this, the output compensator 52b (19b) is prohibited from outputting the droplet separation detection signal S50a as the output compensation signal S52b even if droplet separation is detected by the droplet separation detector 51 (15). This disable-compensation period may be set to the pulse period tp set by the pulse time setter 20 of the configuration unit 53b, for example.

The welding power controller 100b3 operates as follows. If neither the output compensation signal S52b nor the shorting detection signal S51 is input to the pulse wave generator 25b during welding (from time t1 to t2 in FIG. 7), the pulse wave generator 25b outputs the steady-state pulse wave to the output controller 11a.

When the short detection signal is then input (at time t5 in FIG. 7), the steady-state pulse wave starting at pulse period tp from when shorting changes to arcing is output to the output controller 11a. During the pulse period tp (from t7 to t8 in FIG. 7) following immediately after shorting changes to arcing (time t7), the output compensator 52a (19a) ignores the droplet separation detection signal S50a from the droplet separation detector 50a (15) as instructed by the disable-compensation setter 38b, and outputs nothing as the output compensation signal S52a to the pulse wave generator 25b, i.e., does not output to the pulse wave generator 25b.

Note that the operation when the droplet separation detection signal S50a is input to the output compensator 52a is the same as described with respect to the welding power controller 100b1 according to the second embodiment above.

Figure 15:
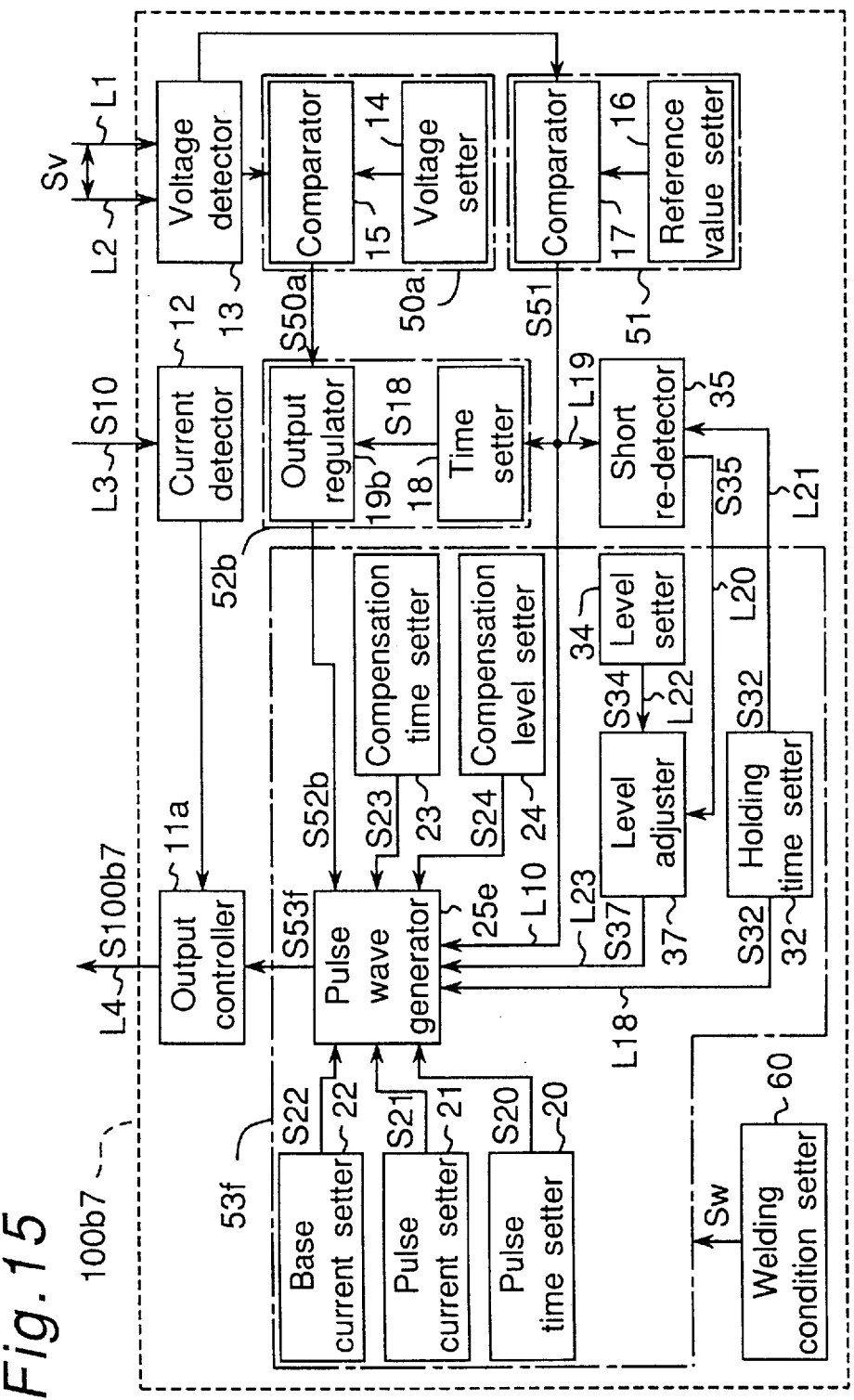
FIG. 15 is a block diagram showing a sixth alternative to the welding power controller of FIG. 6.

FIG. 15 is a waveform diagram of the welding current waveform when shorting is detected in the present embodiment.

As a result, the welding power controller 100b3 according to this alternative embodiment achieves at least the same effects as those of the controller 100b1 according to the second embodiment by repeating the operation described above during welding. In addition, however, false detection of droplet separation due to noise during droplet formation immediately after droplet separation can be prevented.

It should be noted that while the steady-state pulse wave in the present embodiment is a constant-current control waveform determined by the pulse current Ip and base current Ib, the same effect can be obtained using a constant-voltage control waveform determined by the pulse voltage Vp.

Figure 11:
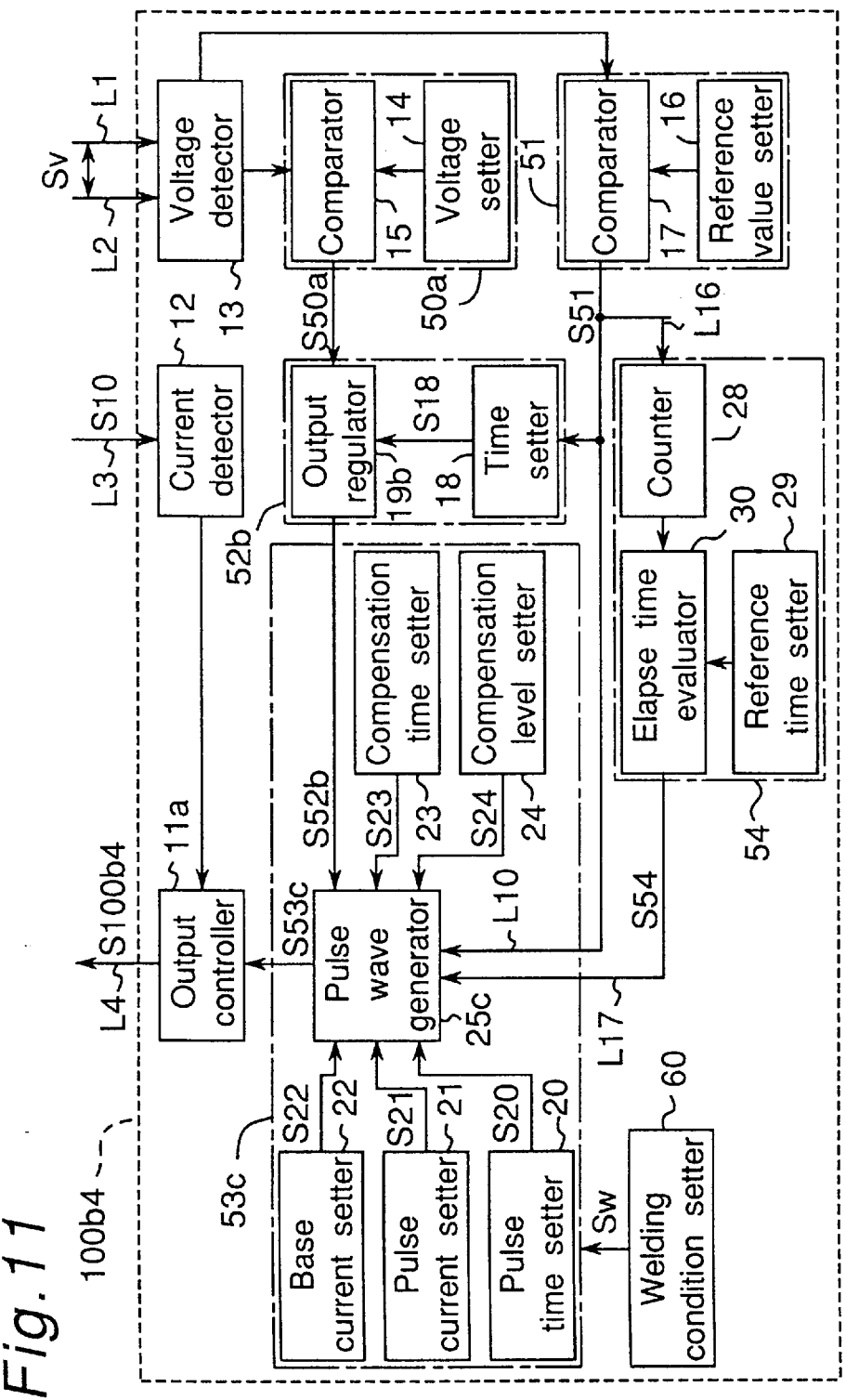
FIG. 11 is a block diagram showing a third alternative to the welding power controller of FIG. 6.

Referring to FIG. 11, a third alternative of the welding power controller 100b1 shown in FIG. 6 is shown. This welding power controller 100b4 has a construction very similar to that of the controller 100b1, wherein the pulse wave generator 25b is replaced by another alternative pulse generator 25c and the output compensator 52a is also replaced by the alternative output compensator 52b shown in FIG. 9. A shorting evaluator 54 connected to the shorting detector 51 by a line L16 is additionally provided for receiving the shorting signal S51 therefrom to discriminate long-term shorts and momentary shorts based on the period from the start to the end of shorting and produce a shorting evaluation signal S54. The long-term shorts are accompanied by droplet transfer; and the momentary shorts are not accompanied by droplet transfer.

By thus inputting the output compensation signal S52b, short detection signal S51, and the shorting evaluation signal S54 to the pulse wave generator 25c, the pulse wave generator 25c is able to distinguish and appropriately handle such long-term shorts and momentary shorts.

More specifically, the shorting evaluator 53 includes a counter 28 connected to the shorting detector 51 (17) by the line L16, a reference time setter 29 for setting a reference time to produce a reference signal, and an elapsed time evaluator 30 connected to the counter 28 and the reference time setter 29. The counter 28 measures the elapsed time from the start of shorting based on the short detection signal S51. The reference time setter 29 sets a reference time value. The elapsed time evaluator 30 compares the measured time counted by the counter 28 with the reference time set by the reference time setter 29, and outputs a specified signal when the measured time exceeds the reference time as the shorting evaluation signal S54.

The maner of handling shorting in this alternative embodiment is described below.

While all shorting occurrences are handled uniformly in the welding power controller 100b1 (FIG. 6) according to the second embodiment, there are actually two types of shorting that may occur during welding. These are long-term shorts accompanying droplet transfer, and short-term shorts, called momentary shorts, whereby there is substantially no droplet transfer.

During momentary shorts there is substantially no droplet transfer because the contact area between the droplet and the molten pool is released in an extremely short period of time due to heat produced by a high density current. This type of momentary shorting often occurs during high current value pulse periods. If the steady-state pulse wave is output immediately after shorting changes to arcing, the wire will continue to melt during that high current value pulse period, and an extremely large droplet will form at the wire end. When such oversize droplets separate, the force of arcing can easily result in spattering. This means that spattering can be reduced by interrupting output of the steady-state pulse wave immediately after momentary shorting not accompanied by droplet transfer ends.

This is accomplished in this alternative embodiment by means of the counter 28, reference time setter 29, and elapsed time evaluator 30 determining the duration of shorting. If the shorting evaluator 54 determines that shorting is momentary shorting, the pulse wave generator 25c interrupts outputting the steady-state pulse wave even when the shorting detector 51 (17) determines that shorting has changed to arcing, and continues to output the same waveform. Only when the shorting evaluator 54 indicates that shorting is long-term shorting does the pulse wave generator 25c output the steady-state pulse wave immediately after shorting changes to arcing as described with respect to the welding power controller 100b1 of the second embodiment above.

The construction and operation of this alternative embodiment is described in further detail below.

If neither the output compensation signal S52b nor the shorting detection signal S51 is input to the pulse wave generator 25c during welding (from time t1 to t2 in FIG. 7), the pulse wave generator 25c is controlled to output the steady-state pulse wave to the output controller 11a.

When the output compensation signal S52b is supplied to the pulse wave generator 25c (at time t2 in FIG. 7), the pulse wave generator 25c outputs a low level compensation current level Ir (S53c) for the compensation period tr (from time t2 to t3 in FIG. 7) set by the compensation time setter 23 of the pulse wave configuration unit 53b starting from the input time of the output compensation signal S52b as in the first embodiment above. When the compensation period tr has passed (at time t3), the steady-state pulse wave having the pulse period tp is then output to the output controller 11a.

When the shorting detection signal S51 is supplied to the pulse wave generator 25c, and therefore also to the shorting evaluator 54, the elapsed time evaluator 30 compares the elapsed time (from time t5 to t7 in FIG. 7) from the start of shorting as measured by the counter 28 with the reference time set by the reference time setter 29. If the elapsed time exceeds the reference time, the elapsed time evaluator 30 outputs (to the pulse wave generator 25) the shorting evaluation signal S54, indicating that shorting is long-term.

When both the short detection signal S51 and the shorting evaluation signal S54 are input to the pulse wave generator 25c, the pulse wave generator 25c recognizes that shorting is long-term. Then the pulse wave generator 25c therefore outputs the steady-state pulse wave starting following after the pulse period tp from the time when the shorting changes to arcing. If only the shorting detection signal S51 is supplied to the pulse wave generator 25c, the pulse wave generator 25c recognizes that shorting is momentary and therefore continues to output the same signal.

By means of this operation, the welding power controller 100b4 is able to reduce spattering similarly to that according to the first embodiment described above. In addition, the present embodiment is able to discriminate long-term shorts from momentary shorts when shorting occurs, prevent droplet overgrowth during momentary shorts, promote droplet formation after shorting changes to arcing when long-term shorting occurs, achieve a uniform droplet separation cycle, and improve welding stability.

It should be noted that while the steady-state pulse wave in the present embodiment is a constant-current control waveform determined by the pulse current Ip and base current Ib, the same effect can be obtained using a constant-voltage control waveform determined by the pulse voltage Vp.

Figure 12:
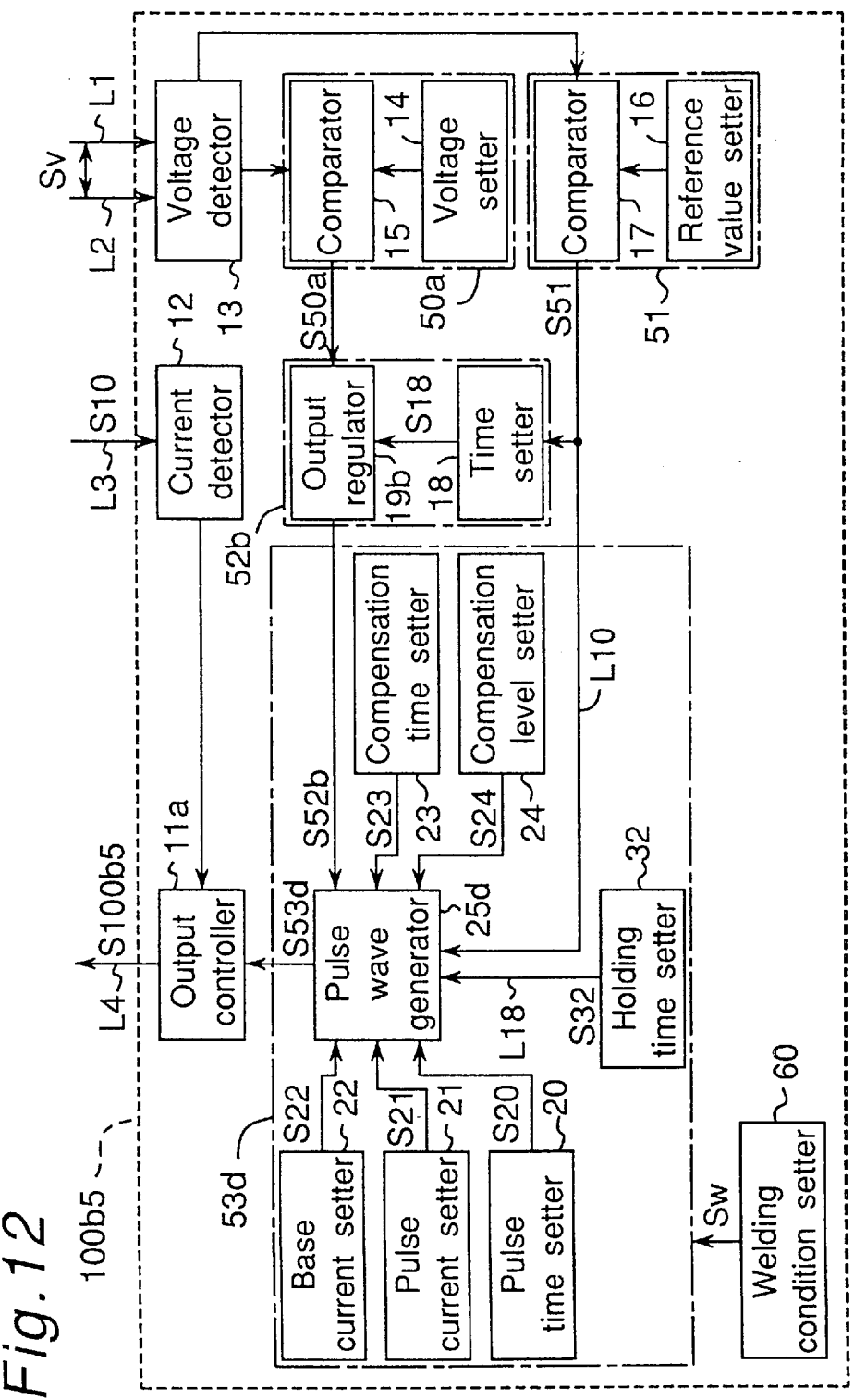
FIG. 12 is a block diagram showing a fourth alternative to the welding power controller of FIG. 6.

Referring to FIG. 12, a fourth alternative of the welding power controller 100b1 (FIG. 6) of the second embodiment is shown. This alternative welding power controller 100b5 has a construction very similar to that of the controller 100b1. The welding power controller 100b5 differs from the welding power controller 100b1 in that the pulse configuration unit 53a in FIG. 6 is replaced by other alternative pulse configuration unit 53d, the pulse wave generator 25a is also replaced by an alternative pulse wave generator 25d, and a holding time setter 32 is additionally provided.

When shorting occurs, the pulse wave generator 25d drops the pulse wave output to a known base current Ib that is set by the base current setter 22 for the known holding period th set by the holding time setter 32 from the time shorting changes to arcing. When holding period th is completed, the pulse wave generator 25d then outputs the steady-state pulse wave that starts at pulse period tp. As a result, the output current level is lowered during shorting.

The welding power controller 100b5 operates as follows.

If neither the output compensation signal S52b nor the short detection signal S51 is input to the pulse wave generator 25d during welding, the pulse wave generator 25d outputs the steady-state pulse wave to the output controller 11 as in the first embodiment above.

When the output compensation signal S52b is then supplied to the pulse wave generator 25d, the pulse wave generator 25d outputs a low level compensation current level Ir for the compensation period tr set by the compensation time setter 23 starting from the input time of the output compensation signal S52b as in the first and second embodiments above. When the compensation period tr has passed, the steady-state pulse wave starting at pulse period tp is then output to the output controller 11.

When the short detection signal S51 is supplied to the pulse wave generator 25d, a low level base current Ib determined by the base current setter 22 is output for the particular holding period th set by the holding time setter 32 from the point it is determined that shorting has changed to arcing. When the holding period th has passed, the steady-state pulse wave starting at pulse period tp is output to the output controller 11.

By repeating this operation during welding, it is possible to reduce spattering as in the second embodiment. By additionally lowering the current level at the point shorting changes to arcing, however, spattering can be reduced even further while also promoting droplet formation after shorting changes to arcing, and welding can be further stabilized.

It should be further noted that while the steady-state pulse wave in this alternative embodiment is a constant-current control waveform determined by the pulse current Ip and base current Ib, the same effect can be obtained using a constant-voltage control waveform determined by the pulse voltage Vp.

Figure 13:
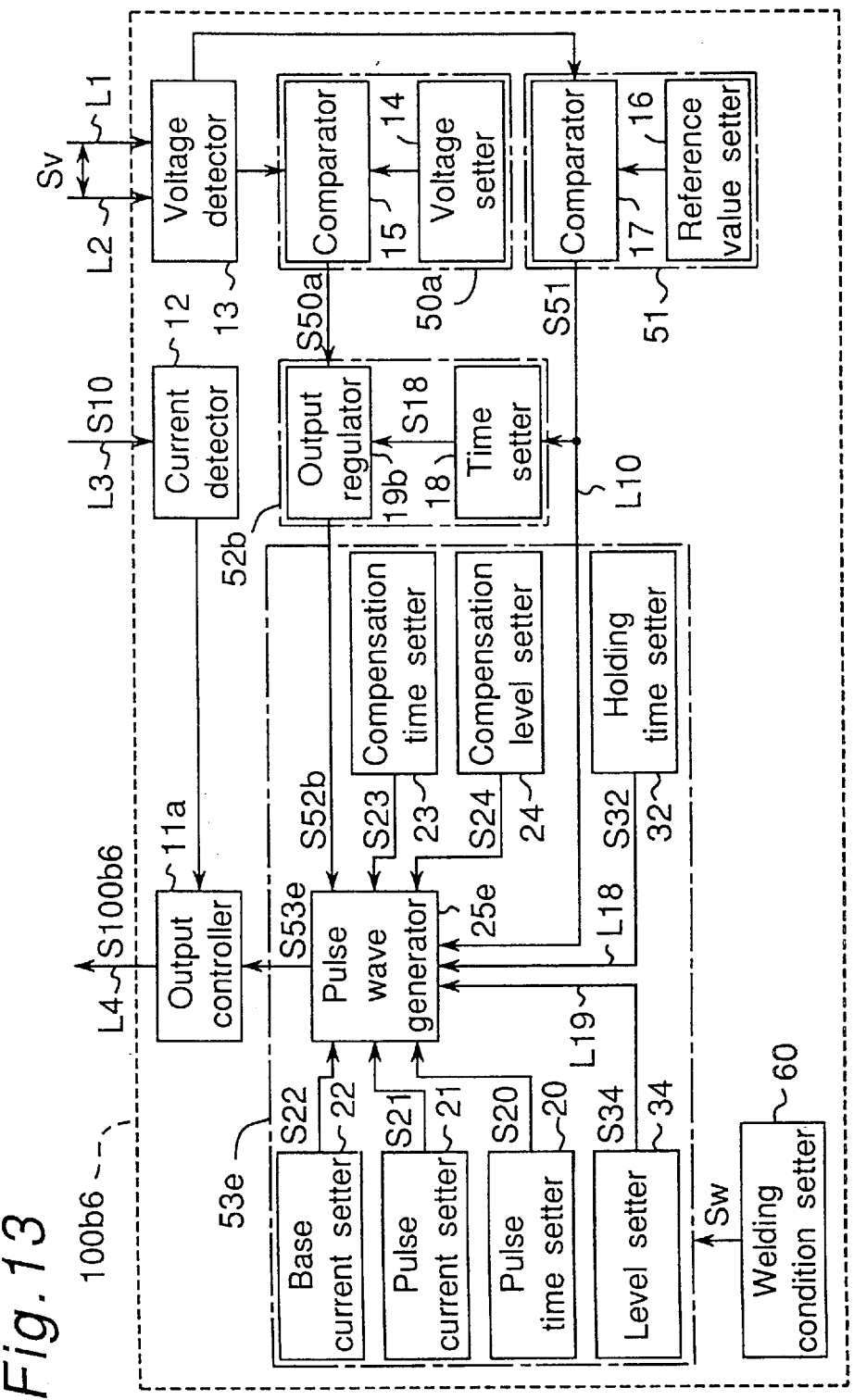
FIG. 13 is a block diagram showing a fifth alternative to the welding power controller of FIG. 6.

Referring to FIG. 13, a fifth alternative of the welding power controller 100b1 according to the second embodiment of the present invention is shown. The welding power controller 100b6 has a construction very similar to that of the fourth alternative shown in FIG. 12, and additionally includes a level setter 34. Accordingly the pulse wave generator 25d is replaced by an alternative pulse wave generator 25, resulting in another alternative of pulse wave configuration unit 53e.

The welding power controller 100b6 differs from the welding power controller 100b5 as follows. When shorting occurs, the pulse wave generator 25 drops the pulse wave output to a known holding current Ih level that is set by the level setter 34 for the known holding period th set by the holding time setter 32 from the time shorting changes to arcing. Also when holding period th is completed, the pulse wave generator 25 then outputs the steady-state pulse wave that starts at pulse period tp. As a result, the output current level is lowered during shorting.

The welding power controller 100b6 according to this alternative embodiment operates as follows.

If neither the output compensation signal S52b nor the shorting detection signal S51 is input to the pulse wave generator 25e during welding, the pulse wave generator 25e outputs the steady-state pulse wave to the output controller 11a as in the first embodiment above.

When the output compensation signal S52b is then supplied to the pulse wave generator 25e, the pulse wave generator 25e outputs a low level compensation current level Ir for the compensation period tr set by the compensation time setter 23 starting from the input time of the output compensation signal S52b, as in the first and second embodiments above. When the compensation period tr has passed, the steady-state pulse wave starting at pulse period tp is then output to the output controller 11a.

When the short detection signal S51 is supplied to the pulse wave generator 25e, a low level holding current Ih determined by the level setter 34 is output for the particular holding period th set by the holding time setter from the time point when it is determined that shorting has changed to arcing. When the holding period th has passed, the steady-state pulse wave starting at pulse period tp is output to the output controller 11.

Figure 14:
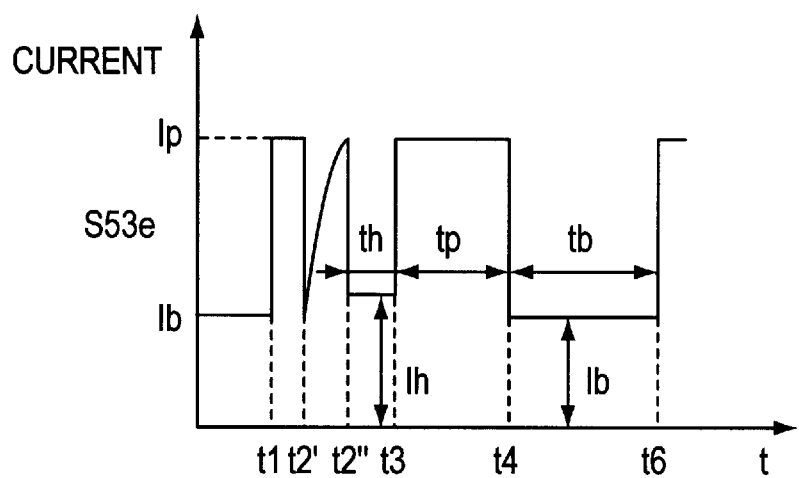
FIG. 14 is a graph showing a wave form of pulse wave signal generated by the welding power controller of FIG. 13.

FIG. 14 is a waveform diagram of the welding current waveform when shorting is detected in the present embodiment.

By repeating this operation during welding, it is possible to reduce spattering as in the second embodiment. By additionally lowering the current level at the point shorting changes to arcing, however, spattering can be reduced even further while also promoting droplet formation after shorting changes to arcing, and welding can be further stabilized.

It should be noted that while the steady-state pulse wave in the present embodiment is a constant-current control waveform determined by the pulse current Ip and base current Ib, the same effect can be obtained using a constant-voltage control waveform determined by the pulse voltage Vp. Note, further, that this fifth alternative embodiment is identical to the fourth alternative embodiment described with reference to FIG. 12 above in all respects other than using the holding current Ih for the base current Ib.

Referring to FIG. 15, a sixth alternative of the welding power controller 100b1 according to the second embodiment of the present invention is shown. This alternative welding power controller 100b7 has a construction very similar to that of the welding power controller 100b5 shown in FIG. 13, but the pulse wave configuration unit 53e is replaced by another alternative pulse wave configuration unit 53e, and a short re-detector 35 and a level adjuster 37 are additionally provided.

The short re-detector 35 is connected to the comparator 17 of the shorting detector 51 by a line L19 and the holding time setter 32 by a line L21 and receives the shorting detection signal S51 and the holding time signal S32 therefrom, respectively. Based on these two signals S51 and S32, the short re-detector 35 produces a shorting re-detection signal S35.

The level adjuster 37 is connected to the short re-detector 35 by a line L20 and to the level setter 34 by a line L22 and receives the shorting re-detection signal S35 and level signal 34 therefrom, respectively. Based on these two signals S35 and S34, the level adjuster 37 produces a level adjust signal S37, and is further connected to the pulse wave generator 25e by a line L23 for supplying the level adjust signal S37 thereto.

When the short re-detector 35 detects shorting that has recurred, the level of the holding current Ih indicated by the level signal S34 output during shorting and set by the level setter 34 is adjusted by the holding time adjuster 36, and the adjusted holding current Ih indicated by the level adjust signal S37 is output therefrom to the pulse wave generator 25e.

This alternative welding power controller 100b7 operates as follows.

If neither the output compensation signal S52b nor the short detection signal S51 is input to the pulse wave generator 25e during welding, the pulse wave generator 25e outputs the steady-state pulse wave signal S53f to the output controller 11a as in the first embodiment above.

When the output compensation signal S52b is then supplied to the pulse wave generator 25e, the pulse wave generator 25e outputs the pulse wave signal S53f indicative of a low level compensation current level Ir for the compensation period tr set by the compensation time setter 23 starting from the input time of the output compensation signal S52b as in the first embodiment above. When the compensation period tr has passed, the steady-state pulse wave signal S53f having the pulse period tp is then output to the output controller 11a.

When the shorting detection signal S51 is supplied to the pulse wave generator 25e, a holding current Ih (signal S34) determined by the level setter 34 is output for the particular holding period th (signal S32) set by the holding time setter 32 from the time point when it is determined that shorting has changed to arcing. If during this holding period th, the short re-detector 35 detects that shorting recurs, the holding current Ih is adjusted by the level adjuster 37, e.g., increased, and the steady-state pulse wave starting at pulse period tp is output to the output controller 11 when the holding period th ends.

As a result, the present embodiment achieves at least the same effects as those of the fifth embodiment by repeating the operation described above during welding.

It should be noted that while the steady-state pulse wave in the present embodiment is a constant-current control waveform determined by the pulse current Ip and base current Ib, the same effect can be obtained using a constant-voltage control waveform determined by the pulse voltage Vp.

Figure 16:
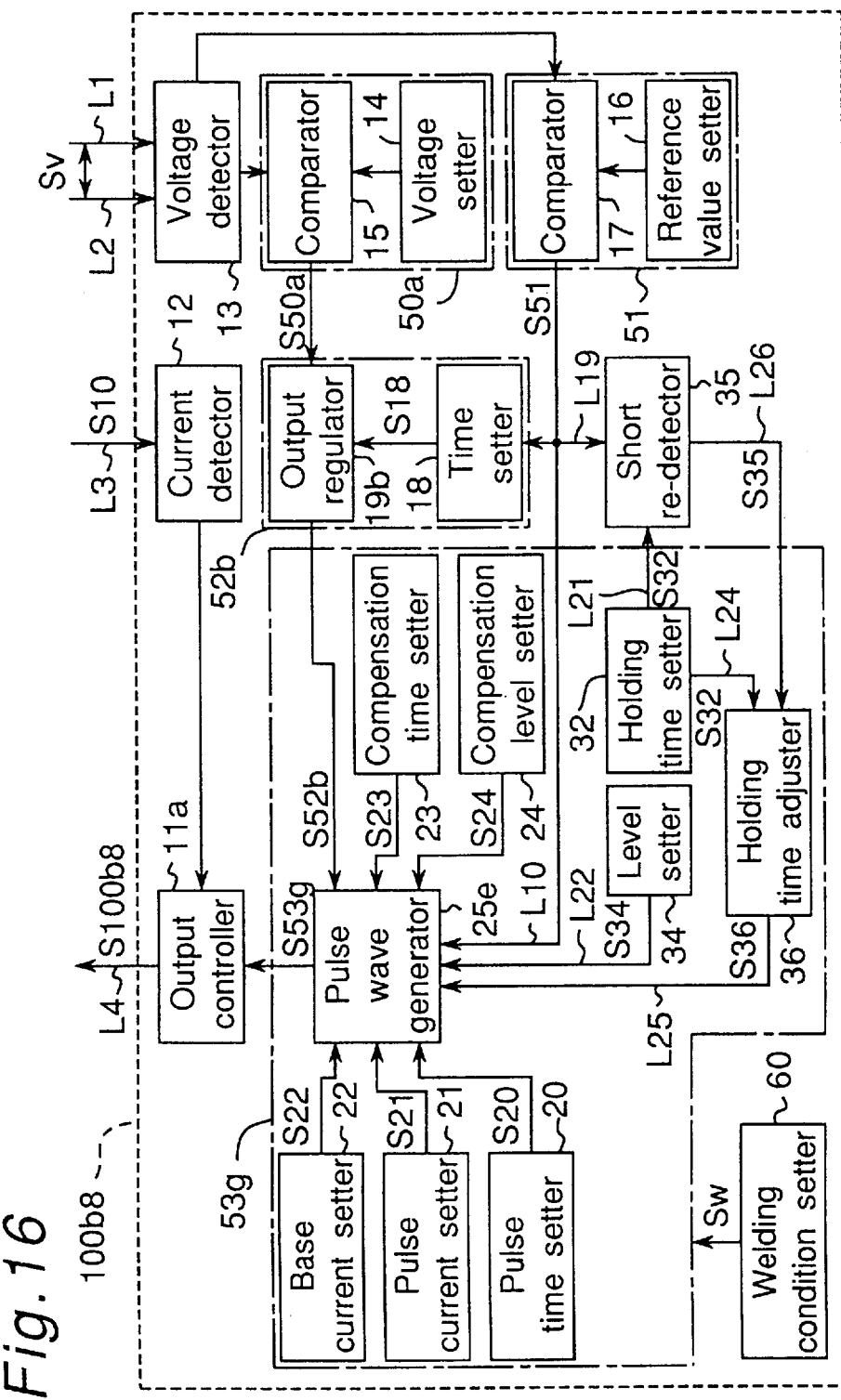
FIG. 16 is a block diagram showing a seventh alternative to the welding power controller of FIG. 6.

Referring to FIG. 16, a seventh alternative of the welding power controller 100b1 according to the second embodiment shown in FIG. 3 is shown. This alternative welding power controller 100b8 has a construction very similar to that of the sixth alternative welding power controller 100b7 shown in FIG. 15. However, the level adjuster 37 in FIG. 15 is removed; and a holding time adjuster 36 is additionally provided in FIG. 16. The holding time adjuster 36 is connected to the holding time setter 32 by a line L24 and to the short re-detector 35 by a line L26 and receives the holding time signal S32 and the shorting re-detection signal S35 therefrom, respectively. Based on these two signals S32 and S35, the holding time adjuster 36 produces a holding time adjust signal S36, and is further connected to the pulse wave detector 25e by a line L25 for supplying the adjust signal S36 thereto.

In this alternative embodiment, the shorting detection signal S52 and the holding time signal S32 are input to the short re-detector 35, which uses the supplied signals S52 and S32 to detect whether shorting recurs within the holding period th set by the holding time setter 32 from the time when shorting changes to arcing. The short re-detector 35 thus supplies the shorting re-detection signal S35 to the holding time adjuster 36, enabling the holding time adjuster 36 to adjust the holding period th output to the pulse wave generator 25e.

The welding power controller 100b8 of this alternative embodiment operates as follows.

If neither the output compensation signal S52b nor the short detection signal S51 is input to the pulse wave generator 25e during welding, the pulse wave generator 25e outputs the steady-state pulse wave to the output controller 11a as in the first embodiment above.

When the output compensation signal S52b is then supplied to the pulse wave generator 25e, the pulse wave generator 25e outputs a low level compensation current level Ir (S53g) for the compensation period tr set by the compensation time setter 23 starting from the input time of the output compensation signal S52b as in the first and second embodiments above. When the compensation period tr has passed, the steady-state pulse wave (S53g) starting at pulse period tp is then output to the output controller 11a.

When the short detection signal S51 is supplied to the pulse wave generator 25e, a holding current Ih (S34) determined by the level setter 34 is output for the particular holding period th (S32) set by the holding time setter 32 from the time point when it is determined that shorting has changed to arcing. If during this holding period th, the short re-detector 35 detects that shorting recurs, the holding period is adjusted by the holding time adjuster 36, e.g., shortened, and the steady-state pulse wave starting at pulse period tp is output to the output controller 11a when the adjusted holding period th ends.

As a result, this alternative welding power controller 100b8 achieves at least the same effects as those of the fourth alternative welding power controller 100b4 shown in FIG. 12 by repeating the operation described above during welding.

It should be noted that while the steady-state pulse wave in this alternative embodiment is a constant-current control waveform determined by the pulse current Ip and base current Ib, the same effect can be obtained using a constant-voltage control waveform determined by the pulse voltage Vp.

Figure 17:
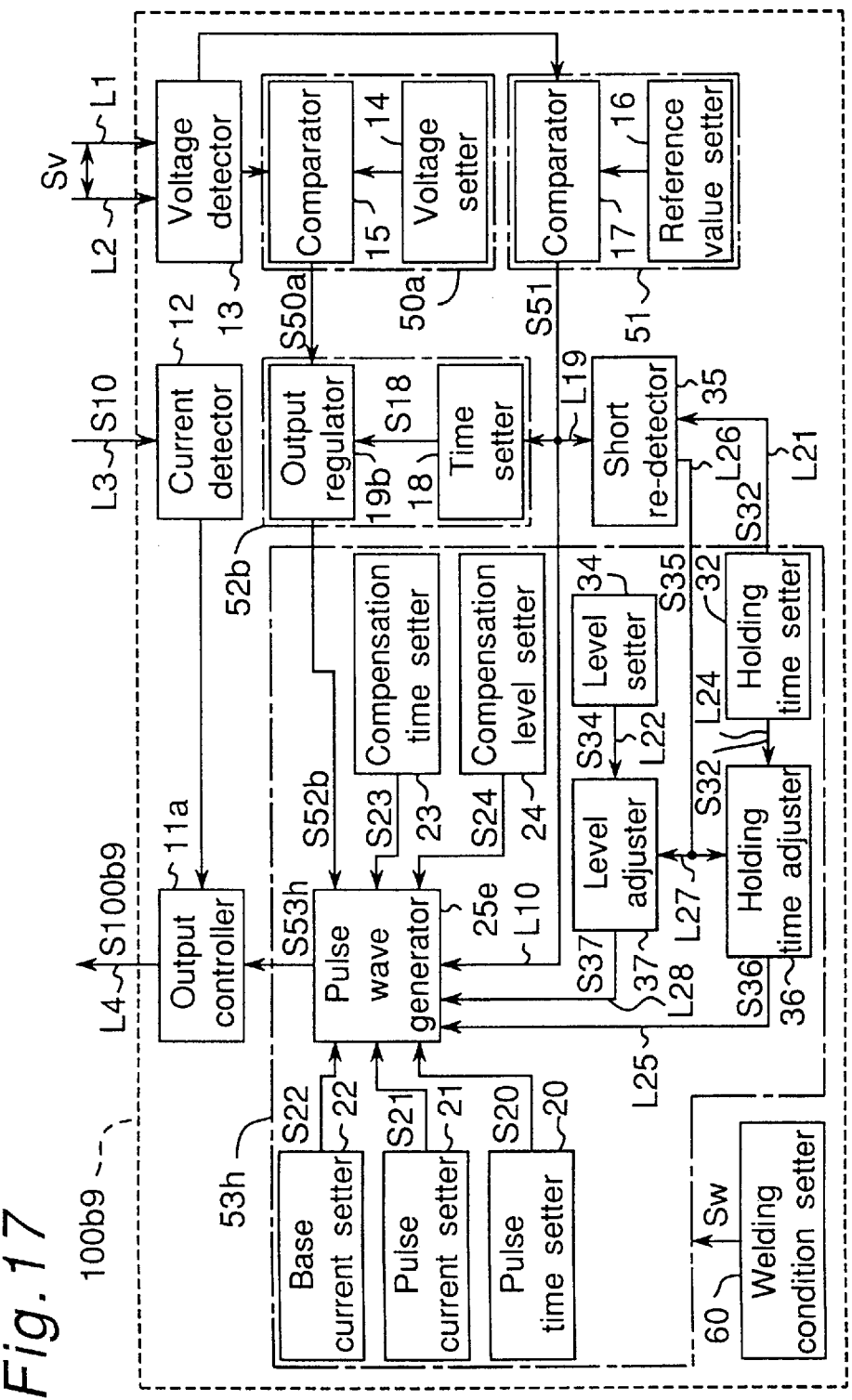
FIG. 17 is a block diagram showing a eighth alternative to the welding power controller of FIG. 6.

Referring to FIG. 17, an eighth alternative of the welding power controller 100b1 according to the second embodiment shown in FIG. 6 is shown. This alternative welding power controller 100b9 has a construction very similar to that of the seventh alternative welding power controller 100b8 shown in FIG. 16. However, a level adjuster 37 is additionally provided between the level setter 34 and the pulse wave generator 25e, and is connected to the short re-detector 35 by a line L27 and receives the shorting re-detection signal S35 therefrom, resulting in another alternative pulse wave configuration unit 53h.

Based on the re-detection signal S35 and the level signal S34 received from the level setter 34 though the line L22, the level adjuster 37 produces a level adjust signal S37 that will be supplied to the pulse wave generator 25e through the line L28.

This welding power controller 100b9 thus comprised operates as follows.

If neither the output compensation signal S52b nor the shorting detection signal S51 is input to the pulse wave generator 25e during welding, the pulse wave generator 25e outputs the steady-state pulse wave to the output controller 11a.

When the output compensation signal S52b is then supplied to the pulse wave generator 25e, the pulse wave generator 25e outputs a low level compensation current level Ir (S53h) for the compensation period tr (S23) set by the compensation time setter 23 starting from the input time of the output compensation signal S52b as in the first embodiment above. When the compensation period tr has passed, the steady-state pulse wave (S53h) starting at pulse period tp is then output to the output controller 11a.

When the shorting detection signal S51 is supplied to the pulse wave generator 25e, a holding current Ih (S34) determined by the level setter 34 is output for the particular holding period th (S32) set by the holding time setter 32 from the time point when it is determined that shorting has changed to arcing. If during this holding period th the short re-detector 35 detects that shorting recurs, the holding current Ih (S37) is adjusted by the level adjuster 37, e.g., increased, and the holding period is adjusted by the holding time adjuster 36, e.g., shortened. When the adjusted holding period th ends, the steady-state pulse wave starting at pulse period tp is output to the output controller 11a.

As a result, this alternative embodiment achieves at least the same effects as those of the fourth alternative embodiment by repeating the operation described above during welding.

It should be noted that while the steady-state pulse wave in this alternative embodiment is a constant-current control waveform determined by the pulse current Ip and base current Ib, the same effect can be obtained using a constant-voltage control waveform determined by the pulse voltage Vp.

Third embodiment

Figure 18:
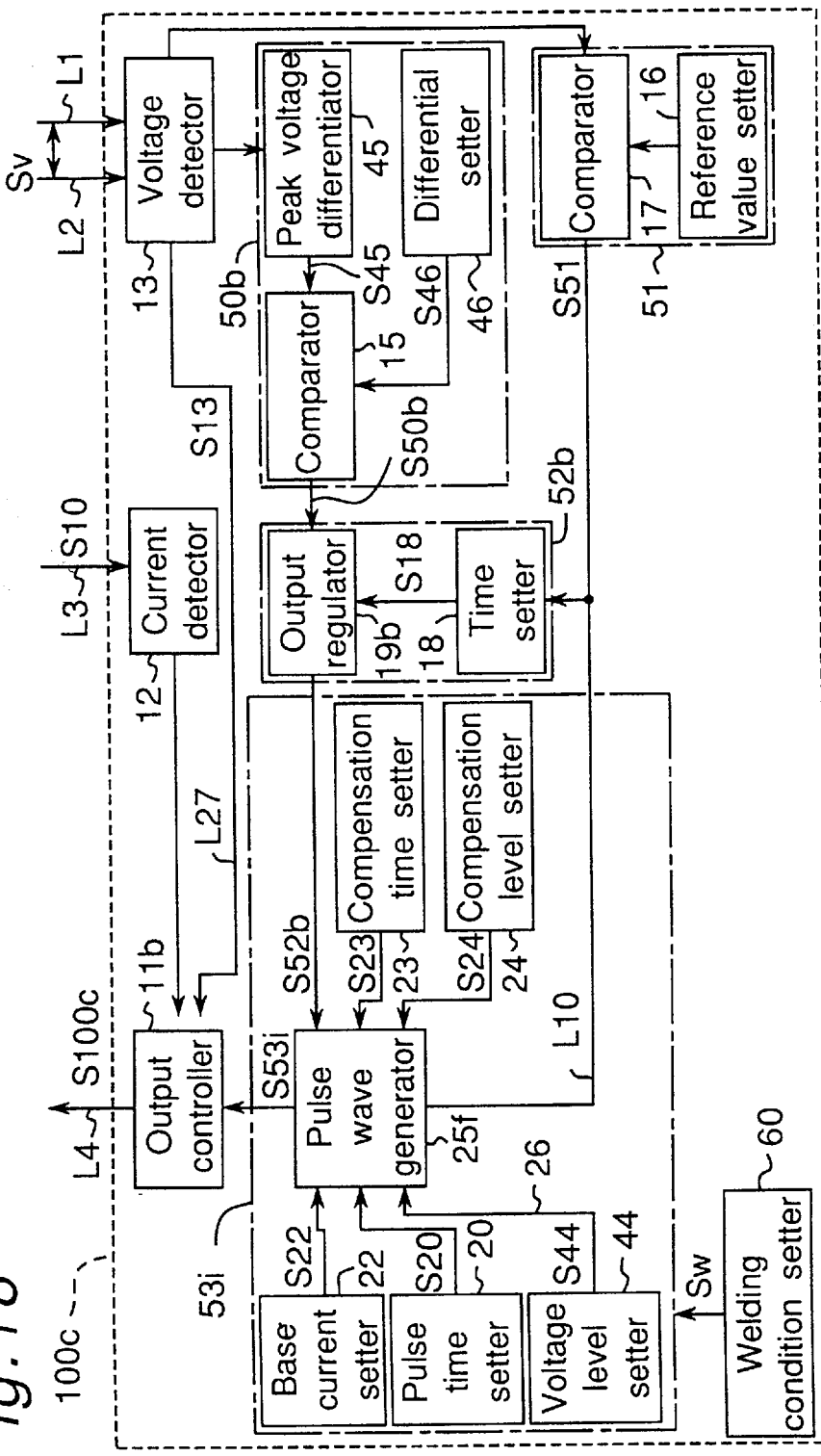
FIG. 18 is a block diagram showing a welding power controller according to a third embodiment of the present invention.

Referring to FIG. 18, a welding power controller according to a third embodiment of the present invention is shown. This welding power controller 100c has a construction very similar to that of the controller 100b1 according to the second embodiment shown in FIG. 6. The welding power controller 100c differs from the welding power controller 100b1 in that the droplet separation detector 50a is replaced by an alternative droplet separation detector 50b including a peak voltage differentiator 45, a differential setter 46, and the comparator 15.

The peak voltage differentiator 45 is connected to the voltage detector 13 and receives the welding voltage signal therefrom to differentiate only the voltage component of the pulse period tp therein, and produces a differentiated signal S45. The differential setter 46 sets a reference differential, and produce a differential signal S46. The comparator 15 is connected both to the differentiator 45 and the setter 46 and receives the signals S45 and S46 therefrom to compare thereof, and produces a droplet separation signal S50b. In other words, the voltage setter 14 used in the welding power controller 100b1 is replaced by the peak voltage differentiator 45 and the differential setter 46.

Furthermore, the pulse wave configuration unit 53b in FIG. 6 is replaced by an alternative pulse wave configuration unit 53i wherein the pulse current setter 21 is removed; the pulse wave generator 25b is also replaced by an alternative pulse wave generator 25f; and a voltage level setter 44 is additionally provided. The voltage level setter 44 sets a voltage level Vp as a pulse voltage signal S44 during the pulse period tp for constant-voltage control based on the welding condition signal Sw, and is connected to the wave generator 25f by a line L26 for supplying the pulse voltage signal S44 thereto.

Based on the signals S20, S22, S23, S24, S44, S51, and S52b, the pulse wave generator 25f produces a pulse wave signal S53i. Based on this pulse wave signal S53i, an output controller 11b replacing the output controller 11a in FIG. 6 shapes the voltage of the welding voltage signal from the voltage detector 13 and the voltage of welding current signal from the current detector 12 to the pulse waveform of the pulse wave signal S53i. Note that the current detector 12 detects the voltage value of the welding current signal S10 which is actually a voltage signal, as desribed in the above.

Figure 19:
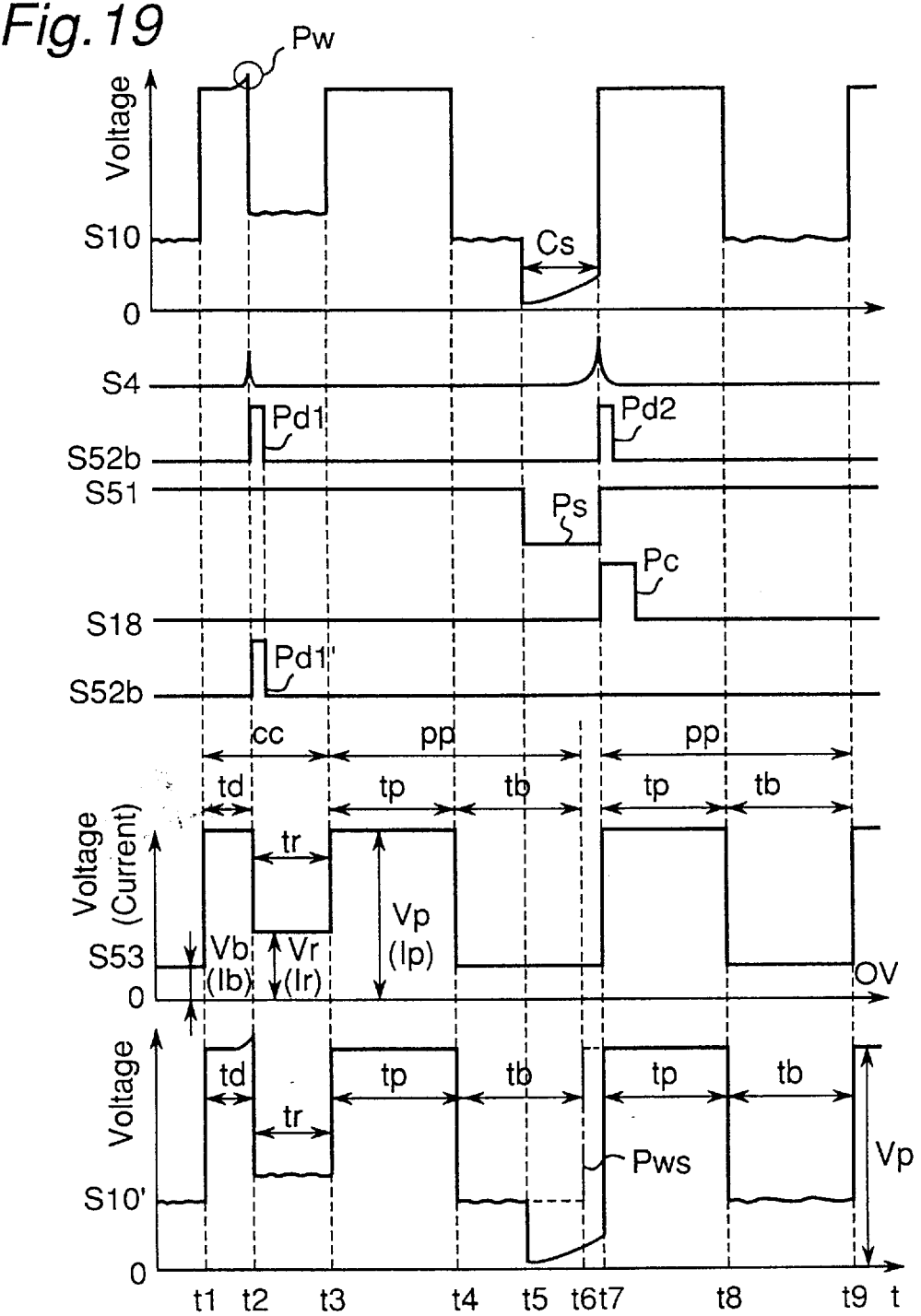
FIG. 19 is a graph showing various signals observed in the welding power controller of FIG. 18.

With reference to FIG. 19, the operation of welding power controller 100c thus comprised is described below.

If neither the output compensation signal S52b nor the short detection signal S51 is input to the pulse wave generator 25f during welding from time t3 to t6, the pulse wave generator 25f outputs (to the output controller 11b) the steady-state pulse wave determined by the pulse period tp (S20) and base period tb (S20) set by the pulse time setter 20 from time t3 to t6, the pulse voltage Vp (S44) set by the voltage level setter 44, and the base current Ib (S22) set by the base current setter 22.

As typically shown by an peak edge Pw of signal S10, when the output compensation signal S52b from the output compensator 19 is then supplied at time t2, the pulse wave generator 25f outputs a low level compensation current level Ir (S53i) for the compensation period tr (S23) set by the compensation time setter 23 starting from the input time of the output compensation signal S52b from the output compensator 52b (19b), as in the first embodiment above. When the compensation period tr has passed at time t3, the steady-state pulse wave starting at pulse period tp is then output to the output controller 11b.

When the short detection signal S51 showing an undergoing pulse is supplied to the pulse wave generator 25f at time t5, the steady-state pulse wave having a pulse period tp is output to the output controller 11b for a period Cs starting from the time when it is determined that shorting has changed to arcing from time t5 to t7. The output controller 11b is controlled to match the detected voltage of the welding voltage detector 13 and the voltage indicative of welding current (S10) detected by the current detector 12 to said constant-voltage pulse waveform.

The droplet separation detection operation is described next.

Because constant-voltage control is used to control the welding voltage during the pulse period tp with this configuration, the output from the peak voltage differentiator 45 is substantially zero when there is no droplet separation. When the droplet separates, however, the arc length increases, the welding voltage rises above the level set by the voltage level setter 44, the voltage increase during the voltage control delay period of the output controller 11b is detected by the peak voltage differentiator 45, and is output to the comparator 15. The comparator 15 then outputs the droplet separation detection signal when the differential signal rises above the reference value set by the differential setter 46.

It should be noted that while the wave in this embodiment is a constant-voltage control waveform determined by the pulse voltage Vp, base voltage Vb, and compensation voltage Vr, the same effect can be obtained using a constant-current control waveform determined by the pulse current Ip, base current Ib, and compensation current Ir, respectively, as shown in FIG. 19.

As a result, the present embodiment simultaneously achieves the same effects as those of the second embodiment.

The droplet separation detector 50a is a means for detecting droplet separation based on the detected welding voltage Sv. When the pulse period is the pulse period for a steady-state pulse wave of constant current control, the detected voltage Sv is compared by the comparator 15 with the particular voltage set by the voltage setter 14. If the detected voltage Sv exceeds said particular voltage, the droplet separation detection signal S50a is output to declare that the droplet separated. When the pulse period is the pulse period for a steady-state pulse wave of constant voltage control, the differential of the detected voltage pulse period is obtained by a differentiator, the differential is compared by a comparator with a particular value output from a differential value setter, and when the differential exceeds the particular value, the droplet separation detection signal is output to declare that the droplet separated.

The shorting detector 51 detects shorting between the welding wire 5 and the welding materials 9. The shorting detector 51 accomplishes this by comparing the detected welding voltage Sv with a particular voltage set by the reference voltage setter 16, and outputs the short detection signal S51 declaring that a short has occurred when the detected voltage Sv is less than said comparison voltage.

The output compensator 52a and 52b (the output regulator 19a and 19b) removes any error information contained in the droplet separation detection signal S50a as a result of shorting noise, and cancels the droplet separation detection signal S50a and S50b for a period set by the time setter 18 as the time required for shorting to stop and arcing begin. For example, the droplet separation detection signal S50a and S50b may be input to an analog gate which is closed for the specified period.

The pulse wave configuration units 53a to 53i(pulse wave generators 25a to 25i) are means for generating the welding pulse wave signals S53a to S53i, respectively. More specifically, each of the pulse wave generators 25a to 25i generates a waveform in which one cycle comprises the pulse period tp and the base period tb with the waveform defined by the current or voltage in each period. The present invention assumes a constant current control steady-state pulse wave of specific pulse current Ip in the pulse period tp and specific base current Ib in the base period tb, and a constant-voltage control steady-state pulse wave of specific pulse voltage Vp in the pulse period tp and specific base current Ib in the base period tb. These various value settings are defined by the pulse time setter 20, the pulse current setter 21, the base current setter 22, and the level setter 34. Note that the waveforms resulting from these settings are preferably programmatically generated in software run by a microcomputer or other device.

The compensation period tr for droplet separation is similarly set by the compensation time setter 23, the compensation current level Ir is set by the compensation level setter 24, the holding period th when shorting occurs is set by a holding time setter 32 (FIGS. 12, 13, 15, 16, and 17), and the holding current Ih is set by a level setter 34 (FIGS. 13, 15, 16, and 17). It should be further noted that these value settings can be stored in ROM when the values are constant, or in registers or other volatile memory when the values are variable.

A short evaluator 54 (FIG. 11) is a means for discriminating long-term shorts accompanied by droplet transfer from momentary shorts not accompanied by droplet transfer. It accomplishes this by measuring, using a counter 28 (FIG. 11), the elapsed time from the start of shorting to the time shorting stops and arcing starts, and then comparing, by means of an elapsed time comparator 30 (FIG. 11), this measured time with a specific reference time output from a reference time setter 29 (FIG. 11).

The disable-compensation setters 38a and 38b (FIGS. 4, 9, and 8) are means for instructing the output compensator 52a and 52b (FIGS. 4, 9, and 8), respectively, to reject the droplet separation detection signal S50a during the pulse period tp of the steady-state pulse wave output immediately after waveform compensation when droplet separation is detected and immediately after shorting stops when shorting has been detected. The disable-compensation setters 38a and 38b (FIGS. 4, 9, and 8) then generate the gate signal S38a and S38b, respectively, from the droplet separation detection signal S50a, short detection signal S51, compensation period tr, and holding period th, and output the gate signals S38a and S38b (FIGS. 4, 9, and 8), respectively, to the output regulators 19a and 19b of the output compensators 52a and 52b as an output compensation signals S38a and S38b (FIGS. 4, 9, and 8).

A short re-detector 35 (FIG. 15) is a means for detecting whether shorting occurs again within a specific holding period th from the first detected short. It accomplishes this by means of a gate that opens and closes at holding period th, for example.

The preferred embodiments of the present invention are described above with reference to the accompanying figures.

As described above, the present invention is able to accurately and appropriately detect droplet separation by removing the false detection component caused by shorting from the droplet separation detection signal when droplet separation is detected based on the welding voltage.

Furthermore, because the pulse period current is lowered when droplet separation is detected at least until the droplet has completely transferred to the molten pool, the separated droplet can be reliably transferred to the molten pool using a weak arc, thereby reducing spatter, achieving a uniform droplet separation cycle, and thereby stabilizing welding results.

Furthermore, by outputting a steady-state pulse wave from the time shorting changes to arcing when shorting is detected, droplet formation is promoted and welding results are stabilized.

Furthermore, by outputting a steady-state pulse wave from the time shorting changes to arcing only when the detected shorting is long-term shorting accompanied by droplet transfer, droplet overgrowth due to momentary shorting can be prevented, droplet formation can be facilitated in the case of long-term shorts, and welding results are stabilized.

The effect of reducing spatter can also be enhanced by lowering the current level for a particular period from the time shorting changes to arcing when shorting is detected.

The effects of noise during welding can also be removed and welding results can be stabilized by removing the droplet separation detection signal during the pulse period of the pulse waveform output immediately after shorting changes to arcing when shorting is detected and immediately after compensation when droplet separation is detected.

It will also be obvious that the various means of the first through twelfth embodiments can also be combined in various ways, and an output control apparatus combining the features of these various embodiments can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A welding power control apparatus for controlling a welding power source of a consumable-electrode type pulse arc welder that uses a shield gas of which carbon dioxide is the major component, said apparatus comprising:

a welding condition detection means for detecting welding conditions; and first pulse wave generation means for generating a first pulse wave defined by a first pulse height for a first predetermined period and a base height lower than said first pulse height for a second predetermined period; and second pulse wave generation means for generating a second pulse wave based on said detected welding conditions, said second pulse wave defined by a second pulse height lower than said first pulse height for a third predetermined period, said second pulse wave interrupting said first predetermined period and replacing said first pulse wave upon a detection of a predetermined welding condition, wherein said second pulse wave is followed by a new first pulse wave as defined by said first predetermined period and said second predetermined period.

2. A welding power control apparatus as claimed in claim 1, wherein said first pulse height is a first current and said base height is a second current smaller than said first current value.

3. A welding power control apparatus as claimed in claim 1, wherein said first pulse height is a first voltage and said base height is a second voltage smaller than said first voltage.

4. A welding power control apparatus as claimed in claim 1, wherein said welding condition detection means comprises:

a welding voltage detection means for detecting the welding voltage;

a droplet separation detection means for detecting the droplet separation of molten droplet from said consumable electrode based on said detected welding voltage; and a short circuit detection means for detecting a short circuit based on said detected welding voltage.

5. A welding power control apparatus as claimed in claim 4, further comprising:

an output compensation means for producing an output compensation signal enabled when said droplet separation is detected, said output compensation signal being disabled for a fourth predetermined period after said short circuit ends.

6. A welding power control apparatus as claimed in claim 5, wherein said first pulse wave is produced when said output compensation signal is disabled and said second pulse wave is produced when said output compensation signal is enabled.

7. A welding power control apparatus as claimed in claim 5, wherein said pulse wave generation means does not produce said first pulse wave when said output compensation signal is enabled and when said short circuit is detected, and produces a second pulse wave starting from a time when said short circuit ends, when said short circuit is detected.

8. A welding power control apparatus as claimed in claim 7, further comprising a short circuit evaluation means for discriminating a long-term short circuit accompanied by droplet transfer from a momentary short circuit not accompanied by droplet transfer based on the period from the start to the end of shorting, whereby said pulse wave generation means ignores said short circuit detection when the short circuit is the momentary short circuit.

9. A welding power control apparatus as claimed in claim 5, wherein said pulse wave generation means does not produce said first pulse wave when said output compensation signal is enabled and when said short circuit is detected, and produces a third pulse wave defined by a third pulse height lower than said first pulse height for a fifth predetermined period after said short circuit ends, said third pulse wave being followed by said first pulse wave.

10. A welding power control apparatus as claimed in claim 9, wherein said third pulse height is any one of a third current and a third voltage.

11. A welding power control apparatus as claimed in claim 9, wherein said third pulse height is set equal to said base pulse height.

12. A welding power control apparatus as claimed in claim 9, further comprising a short circuit re-detection means for detecting a repeated short circuit within said fifth predetermined period to adjust the time length of said fifth predetermined period.

13. A welding power control apparatus as claimed in claim 9, further comprising a short re-detection means for detecting a repeated short within said fifth predetermined period to adjust said third pulse height.

14. A welding power control apparatus as claimed in claim 9, further comprising a short circuit re-detection means for detecting a repeated short circuit within said fifth predetermined period to adjust said third predetermined period and said third predetermined height.

15. A welding power control apparatus as claimed in claim 5, further comprising a disable-compensation means for disabling said output compensation signal for said first predetermined period immediately after said third predetermined period.

16. A welding power control apparatus as claimed in claim 5, further comprising a disable-compensation means for disabling said output compensation signal for said first predetermined period immediately after said short circuit ends.

17. A welding power control apparatus as claimed in claim 5, further comprising a disable-compensation means for disabling said output compensation signal for said first predetermined period immediately after said third predetermined period and immediately after said short circuit ends.

18. A welding power control apparatus as claimed in claim 4, wherein said droplet separation detection means detects the droplet separation when said detected welding voltage is greater than a first predetermined voltage.

19. A welding power control apparatus as claimed in claim 18, wherein said droplet separation detection means detects said droplet separation when said detected voltage is greater than a predetermined voltage value while said first pulse wave is used.

20. A welding power control apparatus as claimed in claim 18, further comprising a droplet separation detection means for comparing said first predetermined voltage with the differential of said detected voltage during said first pulse period to produce said droplet separation detection signal when said detected voltage differential that rises during the first pulse wave control delay period exceeds said first predetermined value, whereby said pulse wave control delay period is the period required for the welding voltage to rise again to said first height pulse height immediately after droplet separation.

21. A welding power control apparatus as claimed in claim 4, wherein said short circuit detection means detects the short circuit when said detected welding voltage is smaller than a second predetermined voltage.

22. A welding power control apparatus as claimed in claim 4, wherein said welding condition detection means further comprises feeding speed detection means for detecting a speed of feeding said consumable-electrode, and wherein said detected welding conditions include said feeding speed.

23. A welding power control method for controlling a welding power source of a consumable-electrode pulse arc welder that uses a shield gas of which carbon dioxide is the major component, said method comprising the steps of:
   detecting welding conditions; and
   generating a first pulse wave defined by a first pulse height for a first predetermined period and having a base height lower than said first pulse height for a second predetermined period ;and
   generating a second pulse wave based on said detected welding conditions, said second pulse wave defined by a second pulse height lower than said first pulse height for a third predetermined period, said second pulse wave interrupting said first predetermined period and replacing said first pulse wave upon a detection of a predetermined welding condition, wherein said second pulse wave is followed by a new first pulse wave as defined by said first predetermined period and said second predetermined period.

24. A welding power control method as claimed in claim 23, wherein said first pulse height is a first current and said base height is a second current smaller than said first current value.

25. A welding power control method as claimed in claim 23, wherein said first pulse height is a first voltage and said base height is a second voltage smaller than said first voltage.

26. A welding power control apparatus as claimed in claim 23, wherein said welding condition detecting step comprises:
   detecting the welding voltage;
   detecting the droplet separation of molten droplet from said consumable electrode based on said detected welding voltage; and
   detecting a short circuit based on said detected welding voltage.

27. A welding power control method as claimed in claim 26, further comprising the step of producing an output compensation signal enabled when said droplet separation is detected, said output compensation signal being disabled for a fourth predetermined period after said short circuit ends.

28. A welding power control method as claimed in claim 27, wherein said first pulse wave is produced when said output compensation signal is disabled and said second pulse wave is produced when said output compensation signal is enabled.

29. A welding power control method as claimed in claim 27, wherein said pulse wave generation step does not produce said first pulse wave when said output compensation signal is enabled and when said short circuit is detected, and produces a second pulse wave starting from a time when said short circuit ends, when said short circuit is detected.

30. A welding power control method as claimed in claim 29, further comprising a short circuit evaluating step to discriminate a long-term short circuit accompanied by droplet transfer from a momentary short circuit not accompanied by droplet transfer based on the period from the start to the end of shorting,
   whereby said pulse wave generation means ignores said short circuit detection when the short circuit is the momentary short circuit.

31. A welding power control method as claimed in claim 27, wherein said pulse wave generation step does not produce said first pulse wave when said output compensation signal is enabled and when said short circuit is detected, and produces a third pulse wave defined by a third pulse height lower than said first pulse height for a fifth predetermined period after said short circuit ends, said third pulse wave being followed by said first pulse wave.

32. A welding power control method as claimed in claim 27, wherein said third pulse height is any one of a third current and a third voltage.

33. A welding power control method as claimed in claim 27, wherein said third pulse height is set equal to said base pulse height.

34. A welding power control method as claimed in claim 27, further comprising a step of disable-compensating to disable said output compensation signal for said first predetermined period immediately after said third predetermined period.

35. A welding power control method as claimed in claim 27, further comprising a step of disable-compensating to disable said output compensation signal for said first predetermined period immediately after said short circuit ends.

36. A welding power control method as claimed in claim 35, further comprising a step of short circuit re-detecting to detect a repeated short circuit within said fifth predetermined period to adjust the time length of said fifth predetermined period.

37. A welding power control method as claimed in claim 35, further comprising a step of short re-detecting to detect a repeated short within said fifth predetermined period to adjust said third pulse height.

38. A welding power control method as claimed in claim 35, further comprising a step of short circuit re-detecting to detect a repeated short circuit within said fifth predetermined period to adjust said third predetermined period and said third predetermined height.

39. A welding power control method as claimed in claim 27, further comprising a step of disable-compensating to disable said output compensation signal for said first predetermined period immediately after said third predetermined period and immediately after said short circuit ends.

40. A welding power control method as claimed in claim 26, wherein said droplet separation detecting step detects the droplet separation when said detected welding voltage is greater than a first predetermined voltage.

41. A welding power control method as claimed in claim 40, wherein said step of droplet separation detecting detects said droplet separation when said detected voltage is greater than a predetermined voltage value while said first pulse wave is used.

42. A welding power control method as claimed in claim 40, further comprising a step of droplet separation detecting to compare said first predetermined voltage with the differential of said detected voltage during said first pulse period to produce said droplet separation detection signal when said detected voltage differential that rises during the first pulse wave control delay period exceeds said first predetermined value, whereby said pulse wave control delay period is the period required for the welding voltage to rise again to said first height pulse height immediately after droplet separation.

43. A welding power control method as claimed in claim 26, wherein said short circuit detecting step detects the short circuit when said detected welding voltage is smaller than a second predetermined voltage.

44. A welding power control method as claimed in claim 26, further comprising a step of feeding speed detecting to detect a speed of feeding said consumable-electrode, and wherein said detected welding conditions include said feeding speed.

45. A welding power control apparatus for controlling a welding power source of a consumable-electrode type pulse arc welder that using a shield gas having carbon dioxide as the major component, said apparatus comprising:

a welding condition detector that detects welding conditions; and a first pulse wave generator that generates a first pulse wave having a first pulse height for a first predetermined period, and a base height lower than said first pulse height for a second predetermined period; and a second pulse wave generator that generates a second pulse wave based on said detected welding conditions, said second pulse wave having a second pulse height lower than said first pulse height for a third predetermined period, said second pulse wave interrupting said first predetermined period and replacing said first pulse wave upon a detection of a predetermined welding condition, wherein said second pulse wave is followed by a new first pulse wave having said first predetermined period and said second predetermined period.

* * * * *